US009069196B2

(12) United States Patent
Yun et al.

(10) Patent No.: US 9,069,196 B2
(45) Date of Patent: Jun. 30, 2015

(54) LIQUID CRYSTAL DISPLAY

(71) Applicant: Samsung Display Co., Ltd., Yongin, Gyeonggi-Do (KR)

(72) Inventors: Sung-Jae Yun, Hwaseong-si (KR); Ohjeong Kwon, Hwaseong-si (KR); Jae Hong Park, Seoul (KR); Shuai Jiang, Yongin-si (KR); Kyunghye Park, Seongnam-si (KR); Jooyoung Yoon, Seoul (KR); Hyeokjin Lee, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 211 days.

(21) Appl. No.: 13/749,131

(22) Filed: Jan. 24, 2013

(65) Prior Publication Data

US 2013/0242219 A1 Sep. 19, 2013

(30) Foreign Application Priority Data

Mar. 15, 2012 (KR) ........................ 10-2012-0026715

(51) Int. Cl.
*G02F 1/1337* (2006.01)
*G02F 1/133* (2006.01)
*G02F 1/1343* (2006.01)

(52) U.S. Cl.
CPC ........ *G02F 1/13306* (2013.01); *G02F 1/13439* (2013.01); *G02F 1/133707* (2013.01); *G02F 2001/133757* (2013.01); *G02F 2001/134345* (2013.01)

(58) Field of Classification Search
CPC ........................ G02F 1/13306; G02F 1/13439
USPC ................. 349/129, 139, 144, 128, 123, 141
See application file for complete search history.

(56) References Cited

U.S. PATENT DOCUMENTS

| 5,309,264 | A | 5/1994 | Lien et al. | |
|---|---|---|---|---|
| 5,726,727 | A * | 3/1998 | Shibahara et al. | ............ 349/144 |
| 7,145,624 | B2 | 12/2006 | Kubo et al. | |
| 7,247,411 | B2 | 7/2007 | Song | |
| 7,505,102 | B2 | 3/2009 | Kubo et al. | |
| 7,564,525 | B2 | 7/2009 | Miyachi et al. | |
| 2006/0012741 | A1* | 1/2006 | Mizusako | ...................... 349/130 |
| 2006/0139541 | A1* | 6/2006 | Yamaguchi et al. | .......... 349/130 |
| 2006/0262264 | A1* | 11/2006 | Miyachi et al. | ............... 349/143 |
| 2008/0111963 | A1* | 5/2008 | Wu et al. | ........................ 349/144 |
| 2009/0040412 | A1* | 2/2009 | Lee et al. | ......................... 349/48 |
| 2009/0147201 | A1* | 6/2009 | Yoshida et al. | ............... 349/129 |
| 2010/0225842 | A1* | 9/2010 | Hur et al. | ......................... 349/48 |
| 2011/0157537 | A1 | 6/2011 | Chen et al. | |
| 2011/0193769 | A1 | 8/2011 | Ohgami et al. | |

(Continued)

FOREIGN PATENT DOCUMENTS

| JP | 2011-145717 A | 7/2011 |
|---|---|---|
| KR | 10-2007-0096557 A | 10/2007 |
| KR | 10-2012-0124012 A | 11/2012 |

*Primary Examiner* — Sang V Nguyen
(74) *Attorney, Agent, or Firm* — Innovation Counsel LLP

(57) ABSTRACT

A liquid crystal display includes at least one pixel. The pixel includes a first sub-pixel charged with a first voltage and a second sub-pixel charged with a second voltage different from the first voltage. A first sub-pixel electrode provided in the first sub-pixel and a second sub-pixel electrode provided in the second sub-pixel include slits having different widths according to directions. Due to the slits, average directors of the first and second sub-pixels are tilted in a horizontal or vertical direction. Accordingly, a side visibility of the display apparatus is improved.

19 Claims, 20 Drawing Sheets

(56) References Cited

U.S. PATENT DOCUMENTS

| | | |
|---|---|---|
| 2011/0242468 A1 | 10/2011 | Choi et al. |
| 2011/0279762 A1 | 11/2011 | Murata et al. |
| 2012/0154727 A1* | 6/2012 | Chang et al. .................. 349/129 |
| 2012/0194753 A1* | 8/2012 | Shin ................................ 349/33 |
| 2012/0281172 A1* | 11/2012 | Park et al. ..................... 349/123 |

* cited by examiner

LIQUID CRYSTAL DISPLAY

CROSS-REFERENCE TO RELATED APPLICATION

This U.S. non-provisional patent application claims priority under 35 U.S.C. §119 of Korean Patent Application No. 10-2012-0026715, filed on Mar. 15, 2012, the contents of which are hereby incorporated by reference.

BACKGROUND

1. Field of disclosure The present disclosure relates to a liquid crystal display. More particularly, the present disclosure relates to a liquid crystal display having an improved visibility.

2. Description of the Related Art

In general, a liquid crystal display includes two transparent substrates and a liquid crystal layer interposed between the two substrates. The liquid crystal display drives the liquid crystal layer to control a transmittance of light passing through pixels, thereby displaying a desired image.

Each pixel is divided into a plurality of domains to widen a viewing angle. To form the domains, the pixel electrode or the common electrode may include a slit. As an alternative means to form the domains, a method of photo-aligning liquid crystals or a method of adding a reactive mesogen into an alignment layer or the liquid crystal layer have been suggested.

Although the viewing angle is widened in such displays, side gamma characteristics (e.g., a side visibility) are different from front gamma characteristics (e.g., a front visibility). That is, the side visibility is worse than a front visibility.

SUMMARY

A liquid crystal display having an improved visibility is provided.

In one aspect, a liquid crystal display includes at least one pixel including a first sub-pixel charged with a first voltage and a second sub-pixel charged with a second voltage different from the first voltage; a first substrate on which a first sub-pixel electrode provided in the first sub-pixel and a second sub-pixel electrode provided in the second sub-pixel are disposed; a second substrate that faces the first substrate and on which a common electrode facing the first sub-pixel electrode and the second sub-pixel electrode is disposed; and liquid crystals interposed between the first substrate and the second substrate. The first sub-pixel electrode includes at least one first slit having a first horizontal portion and a first vertical portion, a width of the first horizontal portion is different from a width of the first vertical portion, and the first slit is arranged along an edge of the first sub-pixel electrode.

The first sub-pixel includes a first thin film transistor outputting a data signal and a first liquid crystal capacitor connected to the first thin film transistor, and the second sub-pixel comprises a second thin film transistor outputting the data signal, a second liquid crystal capacitor connected to the second thin film transistor, a third thin film transistor turned on at a different time point from the second thin film transistor, and a coupling capacitor electrically connected to the second liquid crystal capacitor to lower a voltage charged in the second liquid crystal capacitor when the third thin film transistor is turned on.

The first sub-pixel is divided into a plurality of domains and the liquid crystals are aligned in a different direction in each domain.

The common electrode includes a second slit disposed in a first portion of the common electrode positioned over the first sub-pixel electrode. The second slit includes a second horizontal portion and a second vertical portion and is disposed at a border between the domains of the first sub-pixel.

A width of the second horizontal portion is different from a width of the second vertical portion.

The first slit is arranged in each of the domains in the first sub-pixel. The first voltage has a level higher than the second voltage, and the first horizontal portion has a width larger than the first vertical portion.

The second sub-pixel electrode includes at least one third slit having a third horizontal portion and a third vertical portion with a width larger than a width the third horizontal portion, and the third slit is arranged along an edge of the second sub-pixel electrode.

The second sub-pixel is divided into a plurality of domains and the liquid crystals are aligned in a different direction in each domain, and the third slit is arranged in each of the domains of the second sub-pixel.

The common electrode includes a fourth slit disposed in a second portion of the common electrode positioned over the second sub-pixel electrode, the fourth slit is disposed at a border between the domains of the second sub-pixel, and the fourth slit includes a fourth horizontal portion and a fourth vertical portion. A width of the fourth horizontal portion is greater than a width of the fourth vertical portion.

In another aspect, a liquid crystal display includes a first substrate that includes a gate line applied with a gate signal and a data line applied with a data signal, a pixel electrode disposed on the first substrate, a thin film transistor disposed on the first substrate to apply the data signal to the pixel electrode in response to the gate signal, a second substrate facing the first substrate and including a common electrode, and liquid crystals interposed between the first substrate and the second substrate. The pixel electrode includes at least one first slit that includes a first horizontal portion and a first vertical portion having a width different from a width of the first horizontal portion. The first slit is arranged along an edge of the pixel electrode.

According to the above, the pixel includes slits having different widths in each direction to control the average directors of the liquid crystals, thereby improving the side visibility of the pixel.

The pixel includes the first and second sub-pixels charged with different voltages from each other. The average directors of the liquid crystals of the first sub-pixel are controlled to be adjacent to the horizontal axis of the first sub-pixel, and thus the side visibility in the low gray-scale range of the pixel may be improved.

In addition, the average directors of the liquid crystals of the second sub-pixel are controlled to be adjacent to the horizontal axis of the second sub-pixel, and thus the side visibility in the high gray-scale range of the pixel may be improved.

BRIEF DESCRIPTION OF THE DRAWINGS

The above and other advantages will become apparent by reference to the following detailed description when considered in conjunction with the accompanying drawings wherein.

DETAILED DESCRIPTION

Figure 1:
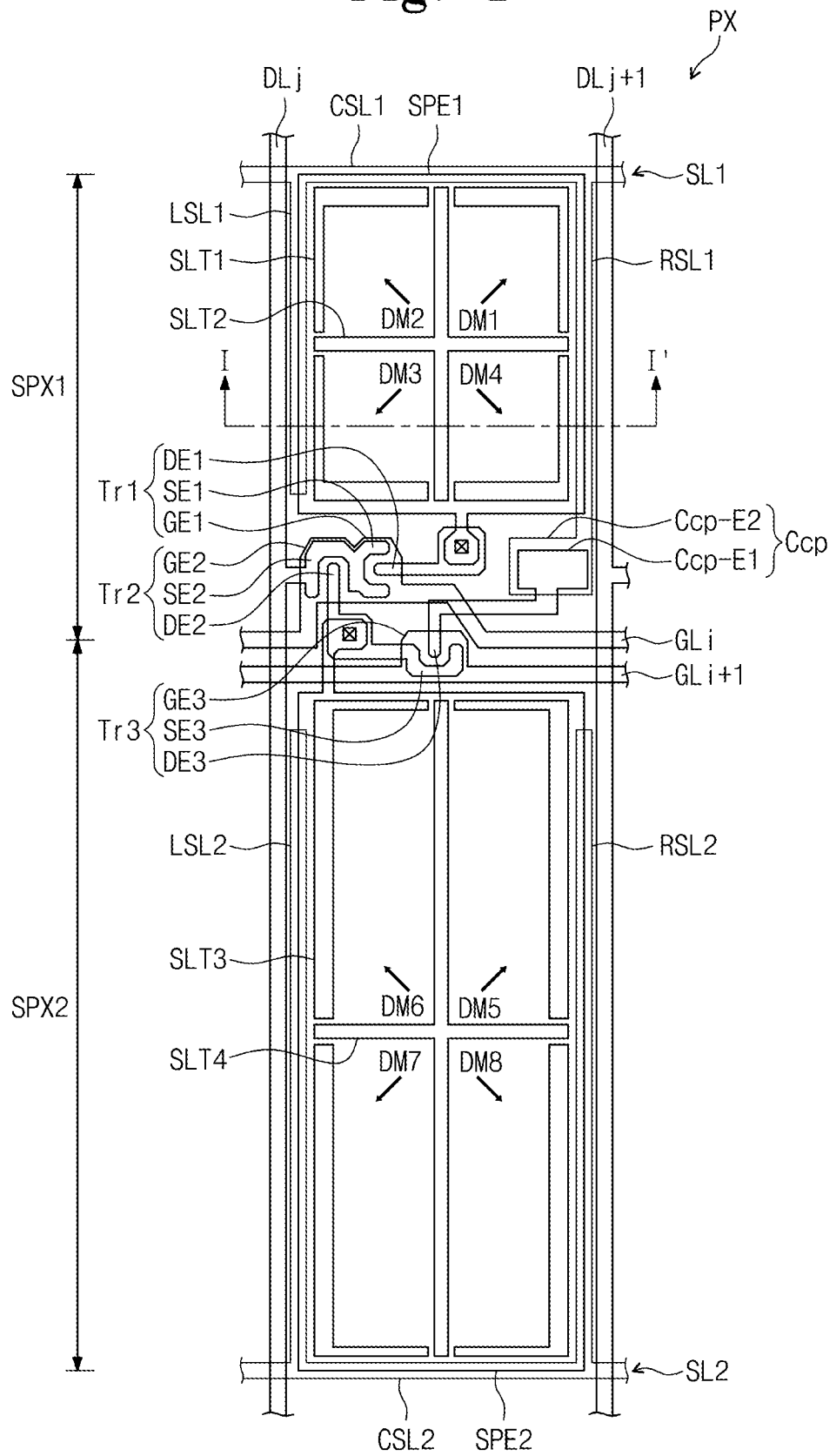
FIG. 1 is a plan view showing a pixel of a liquid crystal display according to an exemplary embodiment.

It will be understood that when an element or layer is referred to as being "on", "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below, depending on the orientation of the device. The device may be otherwise oriented (rotated 90 degrees or at other orientations) and the spatially relative descriptors used herein interpreted accordingly.

The terminology used herein is for the purpose of describing particular embodiments only and is not intended to be limiting. As used herein, the singular forms, "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the relevant art. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings.

Figure 2:
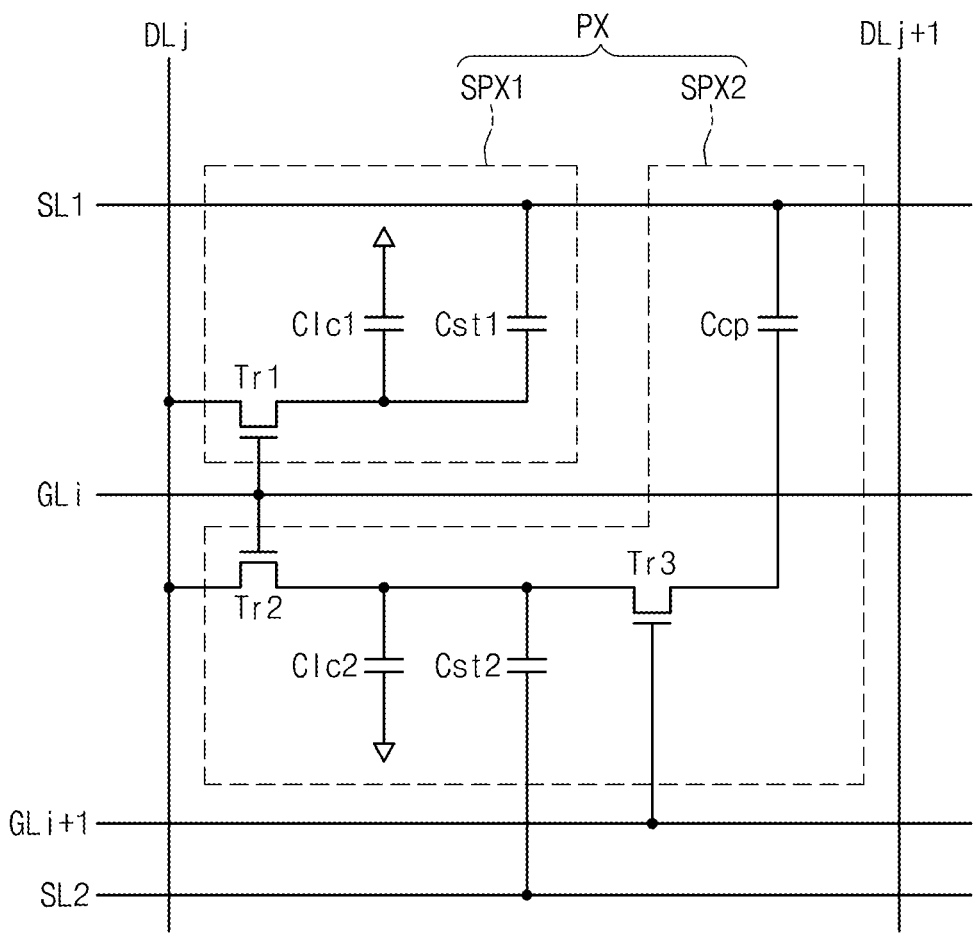
FIG. 2 is an equivalent circuit diagram showing a pixel of FIG. 1.
Figure 3:
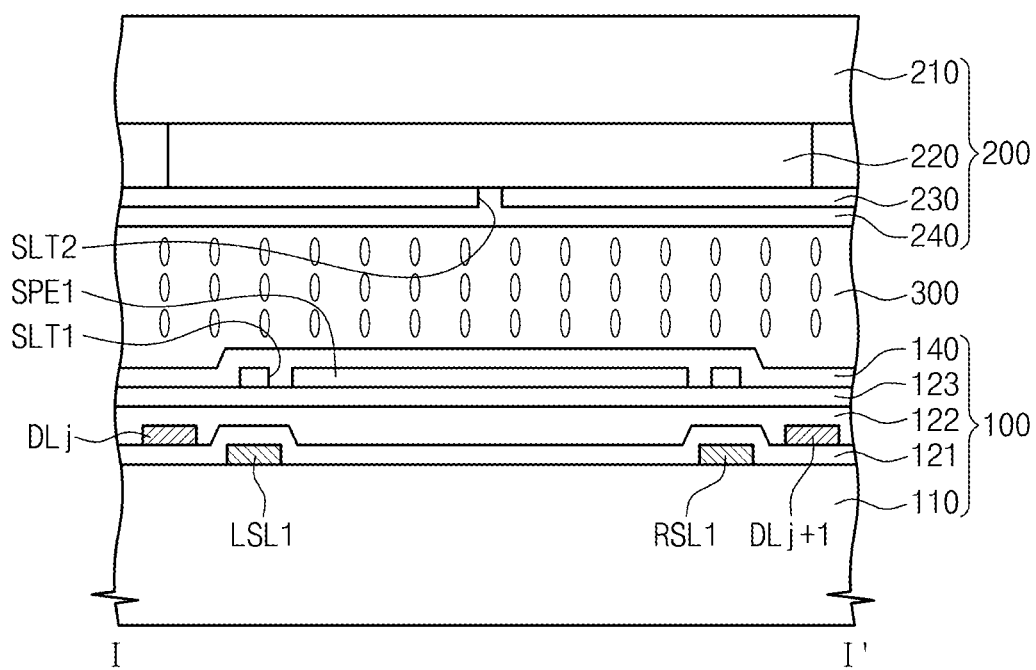
FIG. 3 is a cross-sectional view taken along a line I-I' of FIG. 1.

FIG. 1 is a plan view showing a pixel of a liquid crystal display according to an exemplary embodiment, and FIG. 2 is an equivalent circuit diagram showing a pixel of FIG. 1. FIG. 3 is a cross-sectional view taken along a line I-I' of FIG. 1.

The liquid crystal display according to an exemplary embodiment includes at least one pixel PX. In FIGS. 1 and 2, only one pixel is illustrated for the convenience of explanation, however, the liquid crystal display may include a plurality of pixels, which are arranged in a matrix configuration.

The liquid crystal display includes a plurality of gate lines and a plurality of data lines. In FIGS. 1 and 2, the gate lines GLi and GLi+1 that apply gate signals to the pixel PX and data lines DLj and DLj+1 that are arranged adjacent to the pixel PX are shown.

One pixel PX is arranged between a first data line DLj and a second data line DLj+1, which are successively arranged. The pixel PX receives a data signal from the first data line DLj. A first gate line GLi and a second gate line GLi+1 are insulated from the first and second data lines DLj and DLj+1 while crossing the first and second data lines DLj and DLj+1.

In addition, the liquid crystal display further includes a first storage line SL1 and a second storage line SL2, which are spaced apart from each other in a plan view. The first and second storage lines SL1 and SL2 are insulated from the first and second data lines DLj and DLj+1.

The first storage line SL1 includes a trunk electrode CSL1, a first branch electrode LSL1 branched from the trunk electrode CSL1, and a second branch electrode RSL1 branched from the trunk electrode CSL1. The second storage line SL2 includes a trunk electrode CSL2, a first branch electrode LSL2 branched from the trunk electrode CSL2, and a second branch electrode RSL2 branched from the trunk electrode CSL2.

The trunk electrode CSL1 of the first storage line SL1 and the trunk electrode CSL2 of the second storage line SL2 are substantially in parallel with the first and second gate lines GLi and GLi+1. The trunk electrode CSL1 of the first storage line SL1 and the trunk electrode CSL2 of the second storage line SL2 are respectively arranged at both sides of the pixel PX with the first and second gate lines GLi and GLi+1 interposed between the trunk electrodes CSL1 and CSL2.

As shown in FIG. 2, the pixel PX includes a first sub-pixel SPX1 and a second sub-pixel SPX2. The first sub-pixel SPX1 and the second sub-pixel SPX2 are charged with different voltages.

The first sub-pixel SPX1 includes a first thin film transistor Tr1, a first liquid crystal capacitor Clc1 (FIG. 2), and a first storage capacitor Cst1. The second sub-pixel SPX2 includes a second thin film transistor Tr2, a second liquid crystal capacitor Clc2, a second storage capacitor Cst2, a third thin film transistor Tr3, and a coupling capacitor Ccp.

As shown in FIG. 1, the first and second thin film transistors Tr1 and Tr2 are electrically connected to the first data line DLj and the first gate line GLi, respectively. In detail, the first thin film transistor Tr1 includes a first source electrode SE1 connected to the first data line DLj, a first gate electrode GE1 connected to the first gate line GLi, and a first drain electrode DE1 connected to a first sub-pixel electrode SPE1. The first source electrode SE1 and the first drain electrode DE1 are disposed on the same layer. In FIG. 1, a semiconductor layer of the first thin film transistor Tr1 is not shown. The semiconductor layer may be interposed between the first gate electrode GE1 and a layer on which the first source electrode SE1 and the first drain electrode DE1 are disposed.

The first sub-pixel electrode SPE1 faces a common electrode 230 (refer to FIG. 3) with a liquid crystal layer 300 (refer to FIG. 3) interposed therebetween and forms the first liquid crystal capacitor Clc1 in cooperation with the common electrode 230.

Also, the first sub-pixel electrode SPE1 is partially overlapped with the first storage line SL1 to form the first storage capacitor Cst1 together with the first storage line SL1. The first storage capacitor Cst1 is connected to the first liquid crystal capacitor Clc1 in parallel.

The second thin film transistor Tr2 includes a second source electrode SE2 connected to the first data line DLj, a second gate electrode GE2 connected to the first gate line GLi, and a second drain electrode DE2 connected to a second sub-pixel electrode SPE2.

The second sub-pixel electrode SPE2 faces the common electrode with the liquid crystal layer interposed therebetween and forms the second liquid crystal capacitor Clc2 in cooperation with the common electrode. The second sub-pixel electrode SPE2 may have an area larger than that of the first sub-pixel electrode SPE1.

In addition, the second sub-pixel electrode SPE2 is partially overlapped with the second storage line SL2 and forms the second storage capacitor Cst2 together with the second storage line SL2. The second storage capacitor Cst2 is connected to the second liquid crystal capacitor Clc2 in parallel.

Referring to FIG. 2, when a first gate signal is applied to the first gate line GLi, the first thin film transistor Tr1 and the second thin film transistor Tr2 are substantially simultaneously turned on. The first gate signal is activated during a high period and inactivated during a low period. The first thin film transistor Tr1 and the second thin film transistor Tr2 are turned on during the high period of the first gate signal.

The data signal applied to the first data line DLj is provided to the first sub-pixel electrode SPE1 and the second sub-pixel electrode SPE2 through the first thin film transistor Tr1 and the second thin film transistor Tr2, respectively. Thus, both the first liquid crystal capacitor Clc1 and the second liquid crystal capacitor Clc2 are charged with a pixel voltage corresponding to the data signal during the high period of the first gate signal.

As shown in FIG. 1, the third thin film transistor Tr3 includes a third source electrode SE3, a third gate electrode GE3, and a third drain electrode DE3. In addition, the coupling capacitor Ccp includes a first electrode Ccp-E1 and a second electrode Ccp-E2.

The third source electrode SE3 is connected to the second drain electrode DE2 of the second thin film transistor Tr2, the third gate electrode GE3 is connected to the second gate line GLi+1, and the third drain electrode DE3 is connected to the coupling capacitor Ccp.

The first electrode Ccp-E1 of the coupling capacitor Ccp is extended from the third drain electrode DE3, and the second electrode Ccp-E2 of the coupling capacitor Ccp is extended from the second branch electrode RSL1 of the first storage line SL1.

The coupling capacitor Ccp includes an insulating layer interposed between the first electrode Ccp-E1 and the second electrode Ccp-E2. In the present exemplary embodiment, the insulating layer may be a first insulating layer 121 shown in FIG. 3, but a structure of the coupling capacitor Ccp should not be limited thereto or thereby.

Referring to FIG. 2, the second gate line GLi+1 receives a second gate signal that is activated during the low period of the first gate signal. The second gate signal rises after the first gate signal falls, and then, the second gate signal falls after a period of time. The first and second gate signal may be, for example, square wave signals.

When the third thin film transistor Tr3 is turned on in response to the second gate signal, a voltage division occurs between the second liquid crystal capacitor Clc2 and the coupling capacitor Ccp. As a result, the pixel voltage charged in the second liquid crystal capacitor Clc2 is lowered. The amount of change in the level of the pixel voltage of the second liquid crystal capacitor Clc2 may depend on the charge rate of the coupling capacitor Ccp.

Consequently, the first liquid crystal capacitor Clc1 is charged with a voltage greater than the voltage charged in the second liquid crystal capacitor Clc2 after a time point at which the second gate signal is generated. Thus, the liquid crystals positioned in the first sub-pixel SPX1 have a different alignment from the liquid crystals positioned in the second sub-pixel SPX2, thereby widening a viewing angle of the pixel PX. However, the configuration of the pixel PX, which includes the first and second liquid crystal capacitors Clc1 and Clc2 charged with different voltages, should not be limited thereto or thereby.

After the time point at which the second gate signal is generated, the voltage charged in the second sub-pixel SPX2 may be smaller than a reference voltage. The reference voltage is defined as a voltage that is able to change the alignment of the liquid crystals included in the liquid crystal layer 300 (refer to FIG. 3).

Although the first sub-pixel SPX1 and the second sub-pixel SPX2 receive the data signal having the same level during the high period of the first gate signal, the second sub-pixel SPX2 may eventually be turned off. That is, the second sub-pixel SPX2 may not transmit a light.

For example, when a low gray-scale data signal is applied to the first data line DLj, the first sub-pixel SPX1 is turned on and the second sub-pixel SPX2 is turned off. On the other hand, when a high gray-scale data signal higher level than the low gray-scale data signal is applied to the first data line DLj, both of the first and second sub-pixels SPX1 and SPX2 are turned on.

The first sub-pixel SPX1, which is turned on even though the low gray-scale data signal is applied thereto, exerts greater influence on the visibility of the liquid crystal display than the second sub-pixel SPX2 within the low gray-scale range.

Both of the first and second sub-pixels SPX1 and SPX2 are turned on when the high gray-scale data signal is applied thereto. Thus, the second sub-pixel SPX2, which has a greater area than the first sub-pixel SPX1, exerts greater influence on the visibility of the liquid crystal display within the high gray-scale range.

Meanwhile, as shown in FIG. 1, the first sub-pixel SPX1 may be divided into a plurality of domains each having a different liquid crystal alignment direction. That is, the liquid crystals positioned in the first sub-pixel SPX1 are divided into groups of liquid crystals, in which the liquid crystals are pre-tilted, that is, aligned with an orientation that is tilted, or at an angle, with respect to the substrates, in different directions from each other. In the case that the liquid crystals are pre-tilted in different directions, the liquid crystals have different directors (hereinafter, referred to as liquid crystal directors) from each other.

The first sub-pixel SPX1 may be divided into a first domain DM1, a second domain DM2, a third domain DM3, and a fourth domain DM4. Each of the first to the fourth domains DM1 to DM4 has an average director corresponding to the pre-tilted directions of the liquid crystals.

Also, the second sub-pixel SPX2 may be divided into a plurality of domains. The second sub-pixel SPX2 may be divided into a fifth domain DM5, a sixth domain DM6, a seventh domain DM7, and an eighth domain DM8.

As stated above, each of the first and second sub-pixels SPX1 and SPX2 includes a plurality of domains, thereby widening the viewing angle of the pixel PX.

Referring to FIG. 3, the liquid crystal display includes a first substrate 100, a second substrate 200 facing the first substrate 100 while being coupled to the first substrate 100, and the liquid crystal layer 300 interposed between the first substrate 100 and the second substrate 200. The liquid crystal layer 300 includes liquid crystals which are vertically aligned. Although not shown in the figure, a cross-sectional view of an area corresponding to the second sub-pixel SPX2 is substantially the same as shown in FIG. 3.

The first substrate 100 includes a first base substrate 110 which is a transparent insulating substrate. The first branch electrode LSL1 and the second branch electrode RSL of the first storage line SL1 are arranged on the first base substrate 110. Although not shown in figures, the first gate line GLi and the second gate line GLi+1 may be arranged in the same layer as the first storage line SL1.

A first insulating layer 121 is disposed on the first substrate 100 to cover the first branch electrode LSL1 and the second branch electrode RSL1 of the first storage line SL1. The first data line DLj and the second data line DLj+1 are arranged on the first insulating layer 121. A second insulating layer 122 is disposed on the first insulating layer 121 to cover the first and second data lines DLj and DLj+1, and a third insulating layer 123 is arranged on the second insulating layer 122. In alternative embodiments, the third insulating layer 123 may be omitted, or an additional insulating layer may be disposed on the third insulating layer 123.

The first sub-pixel electrode SPE1 is disposed on the third insulating layer 123. A first alignment layer 140 is disposed on the third insulating layer 123 to cover the first sub-pixel electrode SPE1. The first alignment layer 140 may include a polymer material in which a decomposition, dimerization, or isomerization reaction occurs upon the application of light (e.g., an ultraviolet ray or a laser). In addition, the first alignment layer 120 may include oligomer cinnamate mixed with polymer-based cinnamate.

Meanwhile, the second substrate 200 includes a second base substrate 210 facing the first base substrate 110. A color filter layer 220 having one of red, green, and blue colors is arranged on the second base substrate 210 in a position corresponding to the position of pixel PX. A common electrode 230 is disposed on the color filter layer 220.

A portion of the common electrode 230 faces the first sub-pixel electrode SPE1 to form the first liquid crystal capacitor Clc1 as shown in FIG. 2. The common electrode 230 receives a common voltage which is different from the data voltage. Although not shown in figures, the other portion of the common electrode 230 faces the second sub-pixel electrode SPE2 shown in FIG. 2 to form the second liquid crystal capacitor Clc2 as shown in FIG. 2.

A second alignment layer 240 is disposed on the common electrode 230. The second alignment layer 240 may include the same material as the first alignment layer 140.

Figure 4A:
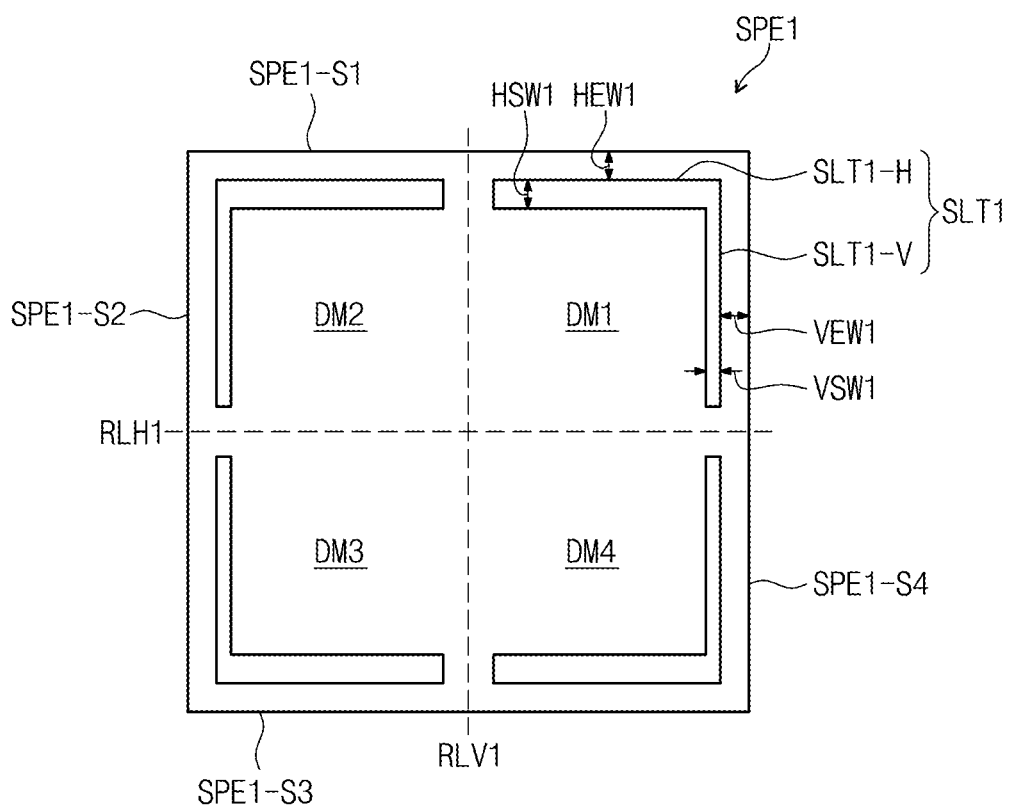
FIG. 4A is a plan view showing the first sub-pixel electrode of FIG. 1.
Figure 4B:
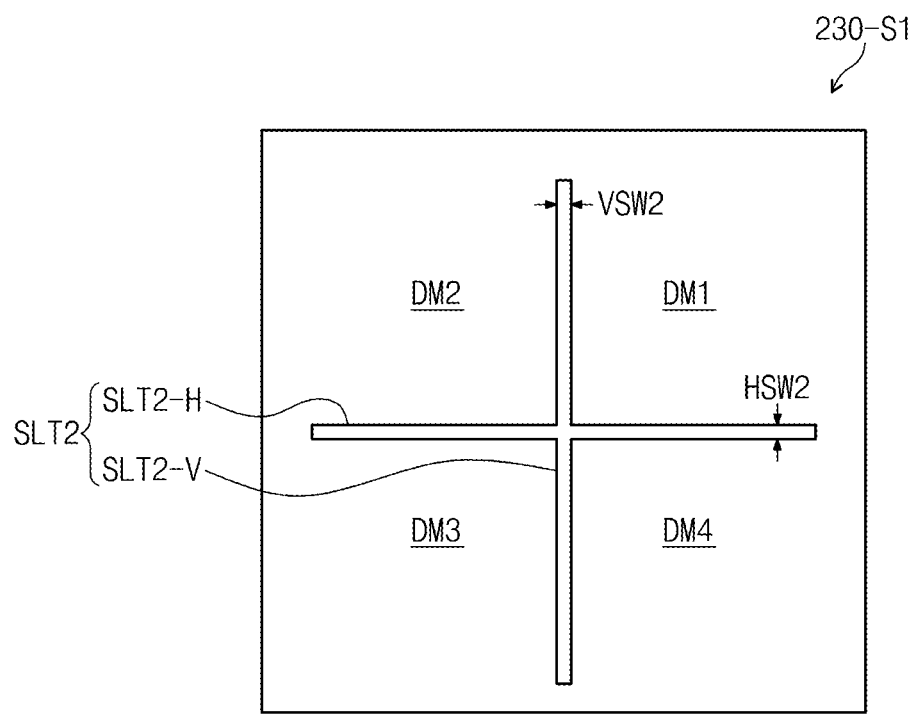
FIG. 4B is a plan view showing a portion of the common electrode corresponding to the first sub-pixel electrode of FIG. 4A.
Figure 4C:
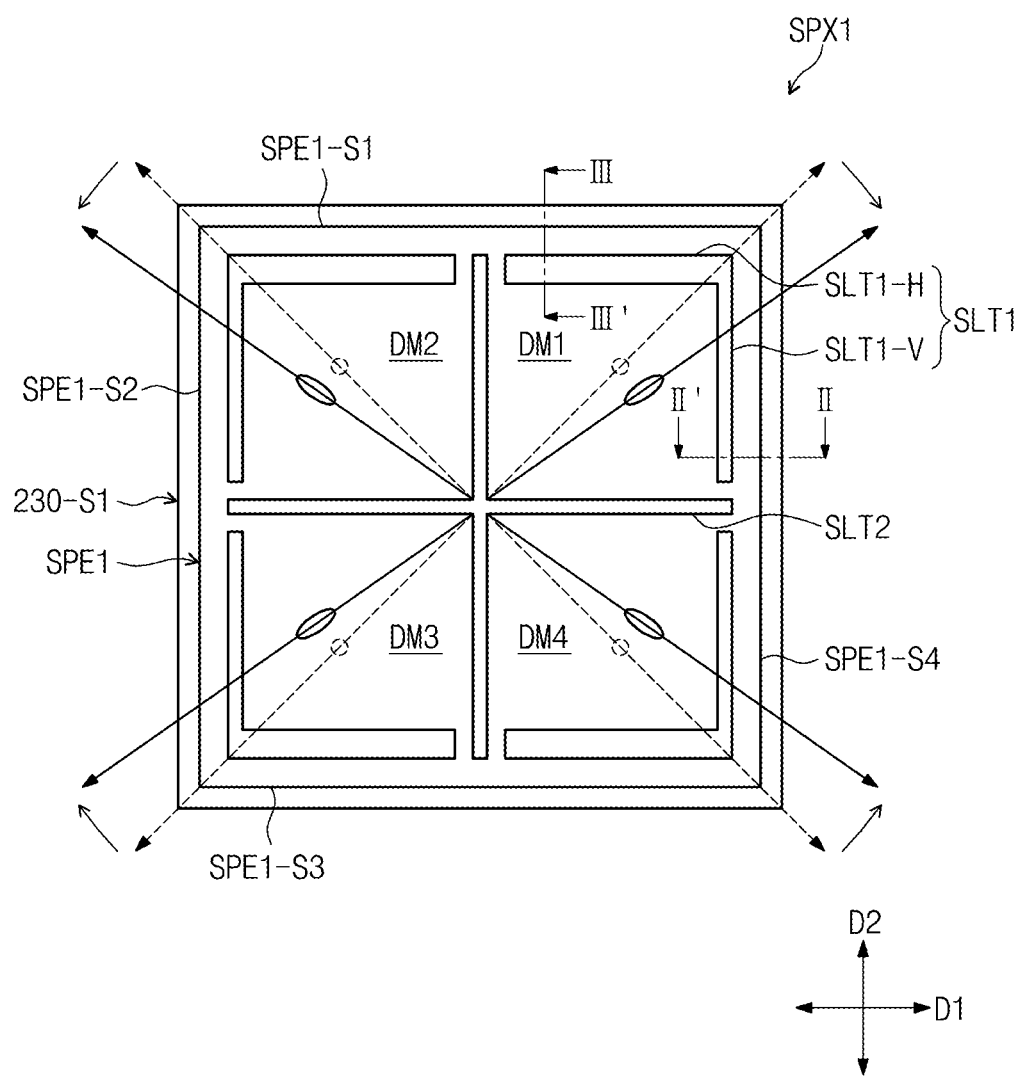
FIG. 4C is a view showing average directors of liquid crystals in the first sub-pixel of FIG. 1.

FIG. 4A is a plan view showing the first sub-pixel electrode of FIG. 1, FIG. 4B is a plan view showing a portion of the common electrode positioned over the first sub-pixel electrode, and FIG. 4C is a view showing average directors of liquid crystals in the first sub-pixel of FIG. 1.

Referring to FIG. 4A, the first sub-pixel electrode SPE1 may include a plurality of first slits SLT1. The first slits SLT1 are each arranged in one of the first to fourth domains DM1 to DM4. The first sub-pixel electrode SPE1 may have a square shape with a first side SPE1-S1, a second side SPE1-S2, a third side SPE1-S3, and a fourth side SPE1-S4 in a plan view. Each of the first to fourth domains DM1 to DM4 may have the same area by dividing the first sub-pixel electrode SPE1 with a horizontal axis RLH1 and a vertical axis RLV1 as shown in FIG. 4A. Both axis RLH1 and RLV1 are shown in FIG. 4A in dashed lines as indicators, but are not physically part of the sub-pixel.

The first slits SLT1 are arranged along the edges of the first sub-pixel electrode SPE1. That is, the first slits SLT1 are arranged adjacent to the first to fourth sides SPE1-S1 to SPE1-S4.

Each of the first slits SLT1 includes a horizontal portion SLT1-H (hereinafter, referred to as a first horizontal portion) and a vertical portion SLT1-V (hereinafter, referred to as a first vertical portion). Hereinafter, one first slit SLT1 will be explained in detail, focusing on the first domain DM1. In an alternative embodiment from that illustrated in FIG. 4A, the first horizontal portion SLT1-H and the first vertical portion SLT1-V may be separated from each other.

The first horizontal portion SLT1-H is disposed adjacent to the first side SPE1-S1, and the first vertical portion SLT1-V is disposed adjacent to the fourth side SPE1-S4. The first horizontal portion SLT1-H is substantially in parallel with the first side SPE1-S1 of the first sub-pixel electrode SPE1, and the first vertical portion SLT1-V is substantially in parallel with the fourth side SPE1-S4 of the first sub-pixel electrode SPE1.

A width HSW1 of the first horizontal portion SLT1-H is different from a width VSW1 of the first vertical portion SLT1-V. As shown in FIG. 4A, the width HSW1 of the first horizontal portion SLT1-H may be greater than the width VSW1 of the first vertical portion SLT1-V. Additionally, a distance HEW1 between the first horizontal portion SLT1-H and the edge of the first side SPE1-S1 may be substantially the same as a distance VEW1 between the first vertical portion SLT1-V and the edge of the fourth side SPE1-S4.

Referring to FIG. 4B, a first portion 230-S1 of the common electrode 230 positioned over the first sub-pixel electrode SPE1 (refer to FIG. 4A) in the liquid crystal display includes a second slit SLT2. In FIG. 4B, an outer line of the common electrode 230 has been shown as an example, and the shape of the common electrode should not be limited by the outer line. In the present exemplary embodiment, the liquid crystal display having the pixels PX includes one common electrode, and the second slit SLT2 is disposed in each pixel PX.

The second slit SLT2 includes a portion that is substantially in parallel with at least one of the first to fourth sides SPE1-S1 to SPE1-S4 of the first sub-pixel electrode SPE1. The second slit SLT2 may include a horizontal portion SLT2-H (hereinafter, referred to as a second horizontal portion) and a vertical portion SLT2-V (hereinafter, referred to as a second vertical portion).

The second horizontal portion SLT2-H and the second vertical portion SLT2-V may cross each other at a position corresponding to the center of the first sub-pixel electrode SPE1. The second horizontal portion SLT2-H is at a position corresponding to a portion of the horizontal axis RLH1 (refer to FIG. 4A) and the second vertical portion SLT2-V is at a position corresponding to a portion of the vertical axis RLV1 (refer to FIG. 4A). In other words, the second slit SLT2 is positioned such that at least a portion of the second slit SLT2 is arranged between the first to fourth domains DM1 to DM4.

A width HSW2 of the second horizontal portion SLT2-H may be the same as a width VSW2 of the second vertical portion SLT2-V.

As shown in FIG. 4C, average directors of the liquid crystals in the first to fourth domains DM1 to DM4 are different from each other. The average directors of the first to fourth domains DM1 to DM4, which are the alignment directions of the liquid crystals, when no pixel voltage is applied, are illustrated by dotted lines. Changes in the average directors of the first to fourth domains DM1 to DM4 observed when the pixel voltage is applied to the first sub-pixel electrode SPE1 will be described with reference to the first domain DM1.

When the pixel voltage is applied to the first sub-pixel electrode SPE1, a direction of the average director of the first domain DM1 is changed under an influence of a fringe electric field generated in the first horizontal portion SLT1-H and the first vertical portion SLT1-V.

In FIG. 4C, the average director of the first domain DM1 represented when the pixel voltage is applied to the first sub-pixel electrode SPE1 is illustrated with a solid line. The average director of the first domain DM1 is tilted more toward a horizontal direction D1 (as shown by the short arrow between the dotted and solid director lines) after the pixel voltage is applied to the first sub-pixel electrode SPE1 than before the pixel voltage is applied to the first sub-pixel electrode SPE1. The average directors of the second to fourth domains DM2~DM4 are also tilted toward the horizontal direction D1.

Meanwhile, when the width HSW1 of the first horizontal portion SLT1-H is the same as the width VSW1 of the first vertical portion SLT1-V, the average director of the first domain DM1 does not be changed to the solid line from the dotted line after the pixel voltage is applied to the first sub-pixel electrode SPE1.

Figure 5A:
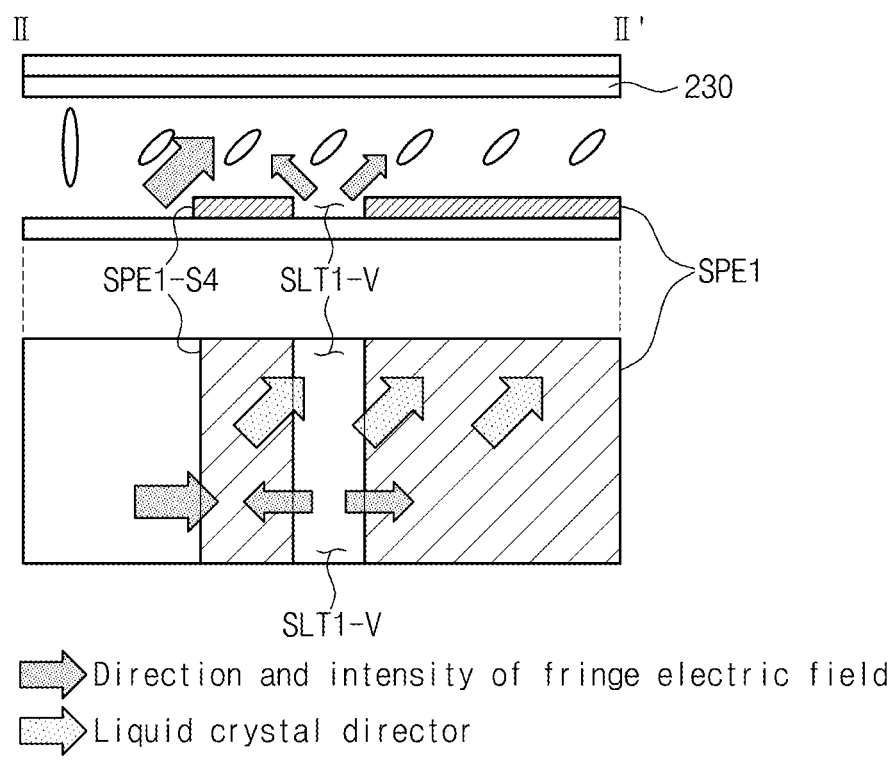
FIG. 5A is a cross-sectional view taken along a line II-II' of FIG. 4C to show a liquid crystal director and includes a graphical section below the cross-section indicating a plan view of the electric field.
Figure 5B:
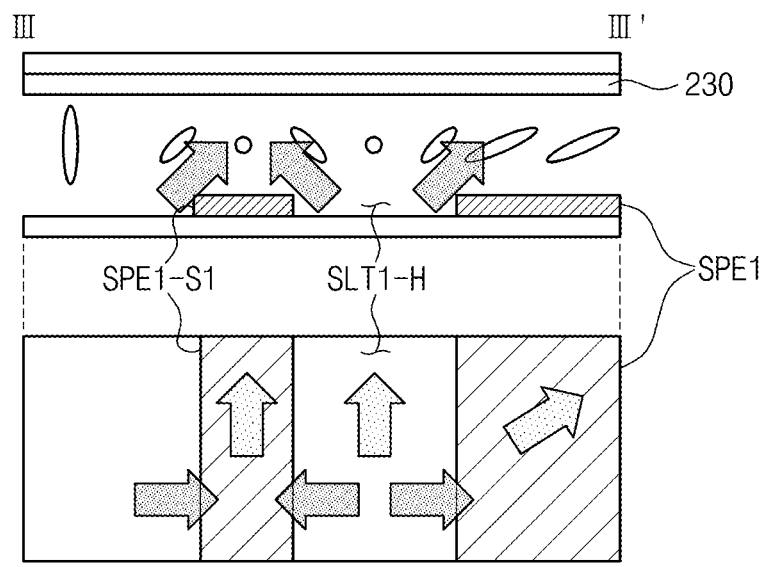
FIG. 5B is a cross-sectional view taken along a line III-III' of FIG. 4C to show a liquid crystal director and includes a graphical section below the cross-section indicating a plan view of the electric field.

FIG. 5A is a cross-sectional view taken along a line II-II' of FIG. 4C to show a liquid crystal director and includes a graphical section below the cross-section indicating a plan view of the electric field, and FIG. 5B is a cross-sectional view taken along a line III-III' of FIG. 4C to show a liquid crystal director and includes a graphical section below the cross-section indicating a plan view of the electric field. Hereinafter, the average director of the first domain DM1 will be described in detail with reference to FIGS. 5A and 5B.

Referring to FIGS. 5A and 5B, fringe electric fields are formed around the first vertical portion SLT1-V and the first horizontal portion SLT1-H of the first slit SLT1. The fringe electric fields are formed in both directions with reference to the first vertical portion SLT1-V, and the fringe electric fields are formed in both directions with reference to the first horizontal portion SLT1-H.

An intensity of the fringe electric field formed around the first vertical portion SLT1-V and the first horizontal portion SLT1-H depends on the width of the first vertical portion SLT1-V and the width of the first horizontal portion SLT1-H.

Because the fringe electric field formed around the first vertical portion SLT1-V is relatively weaker than the fringe electric field formed at the edge of the fourth side SPE1-S4 of the first sub-pixel electrode SPE1, the liquid crystal directors positioned around the first vertical portion SLT1-V have a predetermined angle with respect to the first vertical portion SLT1-V.

On the other hand, the fringe electric field formed around the first horizontal portion SLT1-H, which has a larger width than the first vertical portion SLT1-V, is relatively stronger. That is, the fringe electric field formed around the first horizontal portion SLT1-H corresponds in size to the fringe electric field formed at the edge of the first side SPE1-S1 of the first sub-pixel electrode SPE1, and thus the liquid crystal directors arranged around the first horizontal portion SLT1-H are aligned substantially in parallel with the first horizontal portion SLT1-H.

The change in an angle of the liquid crystal directors around the first vertical portion SLT1-V is different from the change in an angle of the liquid crystal directors around the first horizontal portion SLT1-H, so that the direction of the average director of the first sub-pixel SPX1 is changed.

Because a vector sum of the average director of the liquid crystals according to the alignment direction of the liquid crystals and the liquid crystal directors around the first vertical portion SLT1-V is greater than a vector sum of the average director of the liquid crystals according to the alignment direction of the liquid crystals and the liquid crystal directors around the first horizontal portion SLT1-H, the average director of the liquid crystals arranged in the first domain DM1 is tilted toward the horizontal direction D1. That is, the average director of the liquid crystals in the first domain DM1 is tilted toward the horizontal axis RLH1 shown in FIG. 4A when the pixel voltage is applied.

However, in order to prevent the average director of the liquid crystals in the first domain DM1 from being tilted toward the horizontal axis more than is necessary, it is desirable that the width of the first horizontal portion SLT1-H is equal to or less than three times of the width of the first vertical portion SLT1-V.

Because the average directors of the first to fourth domains DM1 to DM4 are tilted toward the horizontal direction D1, a brightness of the first sub-pixel SPX1 decreases. In addition, when the brightness of the first sub-pixel SPX1 is decreased, the side visibility may be improved in the low gray-scale range. Detailed descriptions of such will be provided below.

Figure 6A:
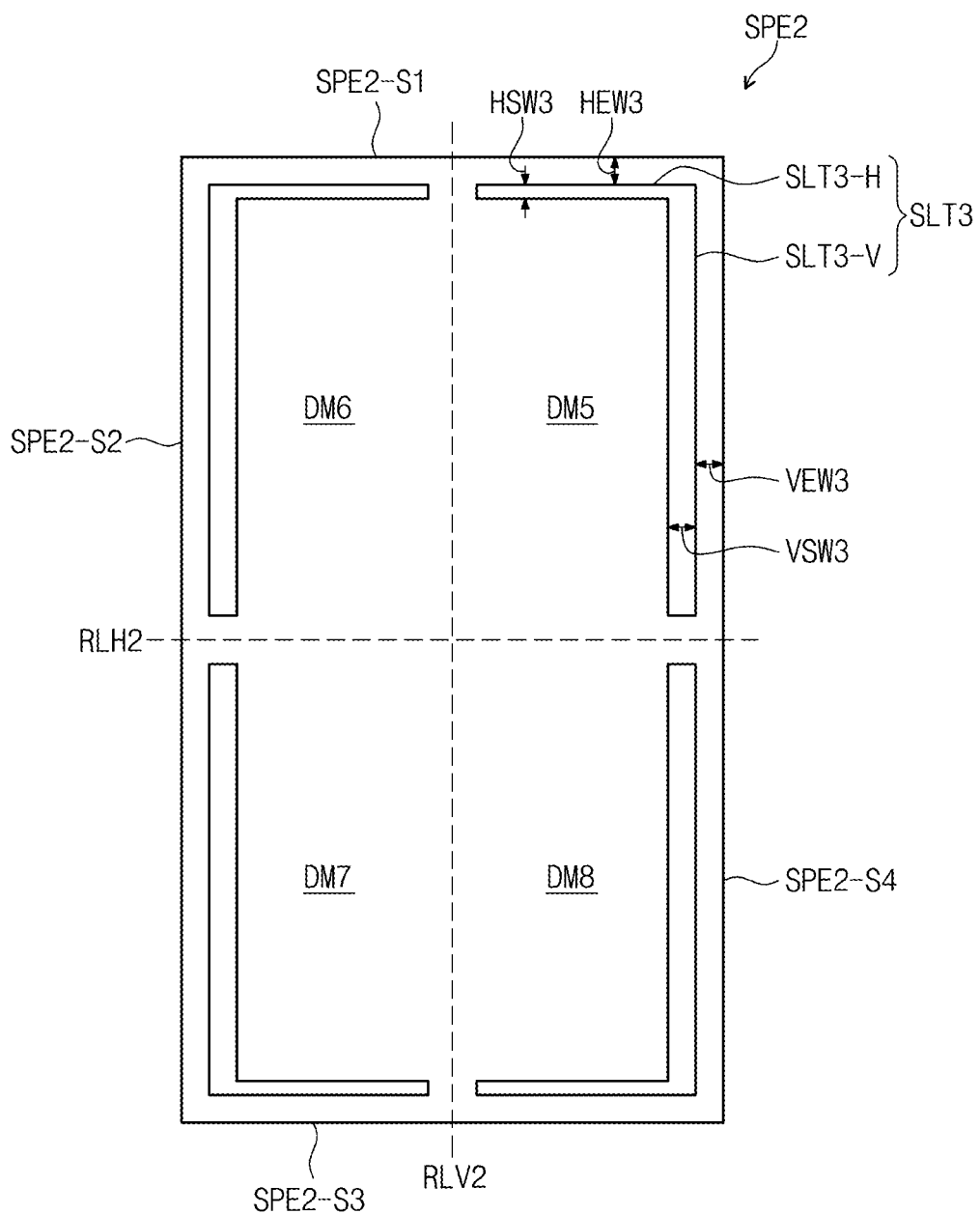
FIG. 6A is a plan view showing the second sub-pixel electrode of FIG. 1.
Figure 6B:
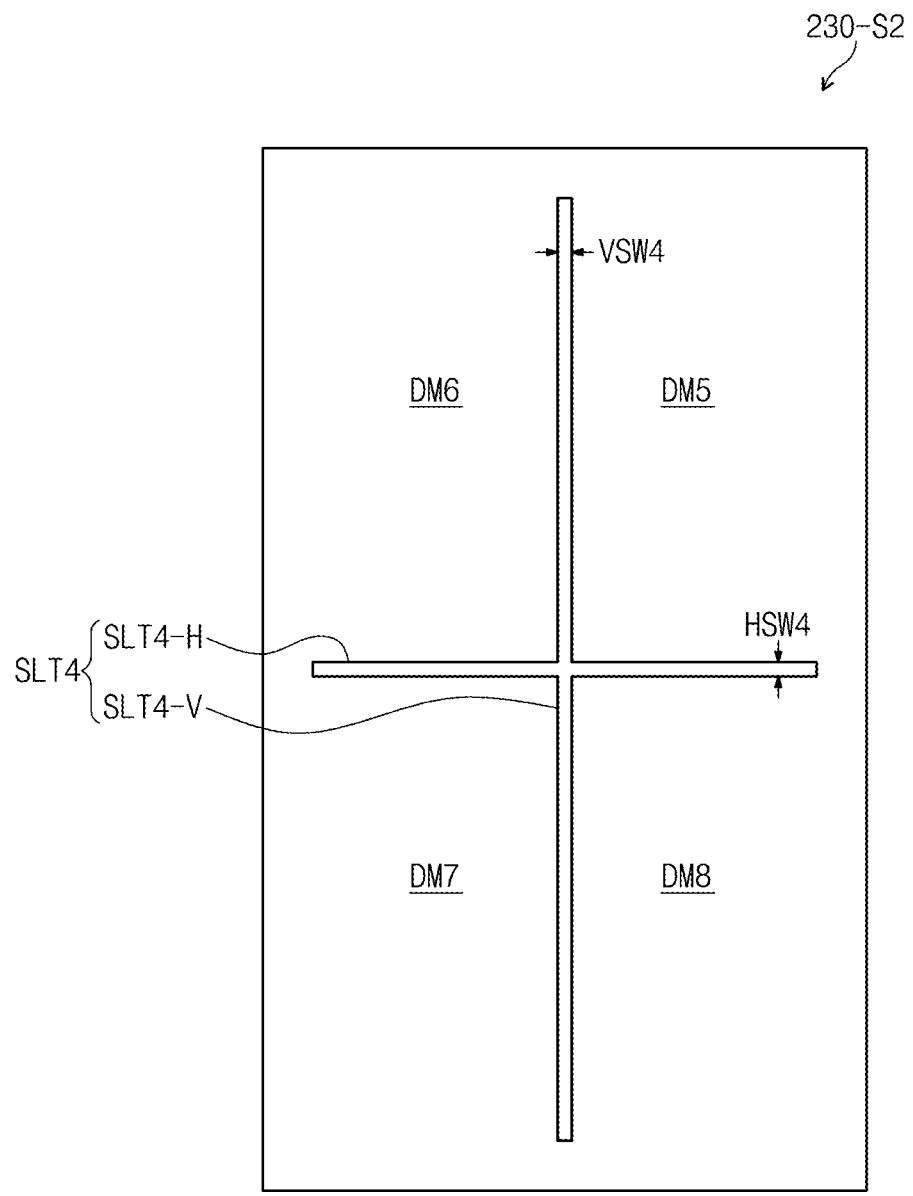
FIG. 6B is a plan view showing a portion of a common electrode corresponding to the second sub-pixel electrode of FIG. 6A.
Figure 6C:
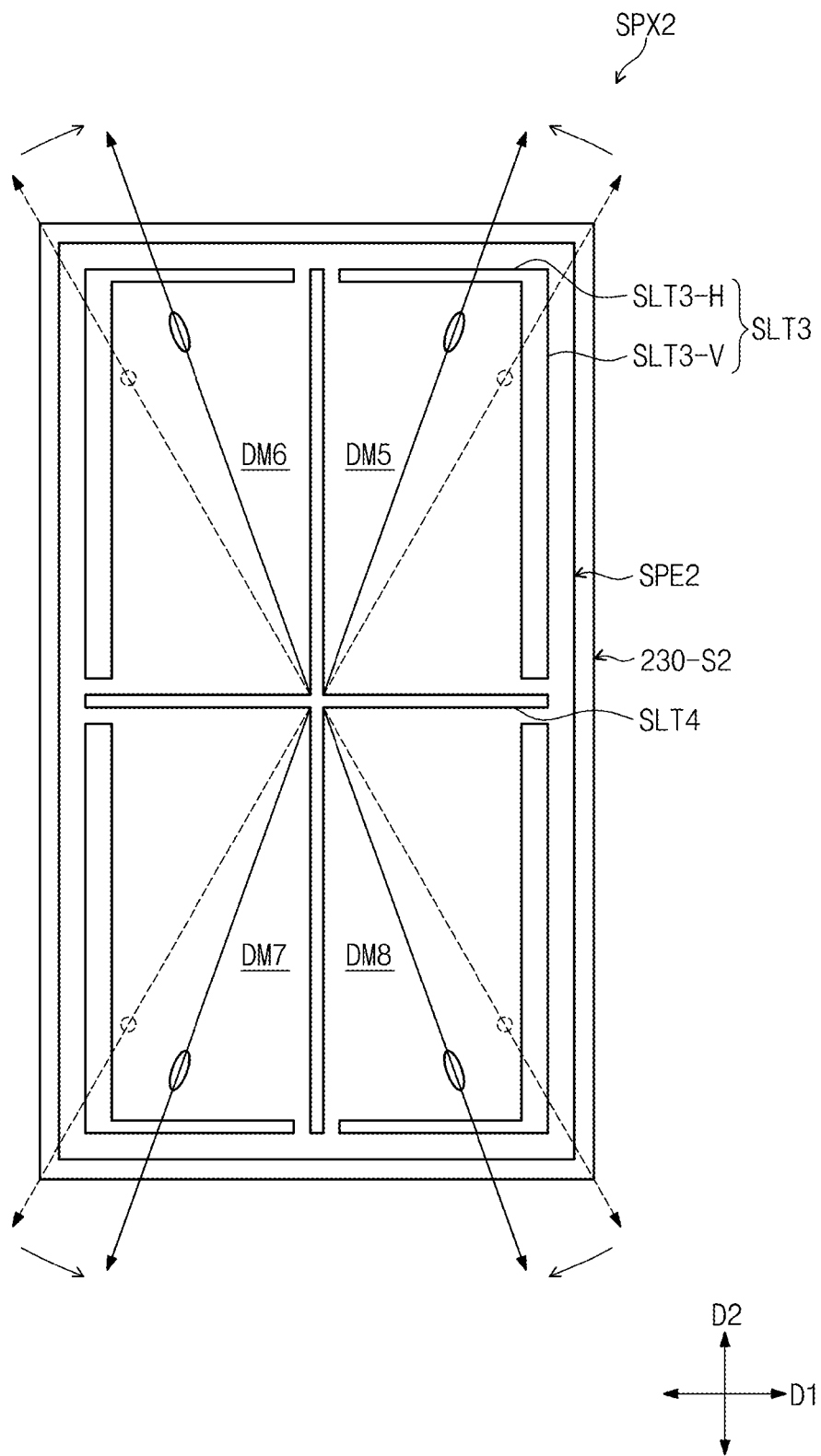
FIG. 6C is a view showing the average director of the liquid crystals in the second sub-pixel of FIG. 1.

FIG. 6A is a plan view showing the second sub-pixel electrode of FIG. 1, FIG. 6B is a plan view showing a portion of a common electrode that overlaps the second sub-pixel electrode of FIG. 6A, and FIG. 6C is a view showing the average director of the liquid crystals in the second sub-pixel of FIG. 1.

Referring to FIG. 6A, the second sub-pixel electrode SPE2 may include a plurality of third slits SLT3. The third slits SLT3 are each arranged in one of the fifth to eighth domains DM5 to DM8. The second sub-pixel electrode SPE2 may have a rectangular shape with a first side SPE2-S1, a second side SPE2-S2, a third side SPE2-S3, and a fourth side SPE2-S4 when viewed in a plan view.

The fifth to eighth domains DM5 to DM8 may have the same area by dividing the second sub-pixel electrode SPE2 with a horizontal axis RLH2 and a vertical axis RLV2 shown in FIG. 6A.

Hereinafter, one third slit SLT3 will be explained in detail, focusing on the fifth domain DM5.

Each of the third slits SLT3 include a horizontal portion SLT3-H (hereinafter, referred to as a third horizontal portion) and a vertical portion SLT3-V (hereinafter, referred to as a third vertical portion). The third horizontal portion SLT3-H of the third slit SLT3 is disposed substantially in parallel with and adjacent to the first side SPE2-S1 of the second sub-pixel electrode SPE2. The third vertical portion SLT3-V is substantially parallel with and disposed adjacent to the fourth side SPE2-S4 of the second sub-pixel electrode SPE2.

A width HSW3 of the third horizontal portion SLT3-H is different from a width VSW3 of the third vertical portion SLT3-V. As shown in FIG. 6A, the width HSW3 of the third horizontal portion SLT3-H may be smaller than the width VSW3 of the third vertical portion SLT3-V. Additionally, a distance HEW3 between the third horizontal portion SLT3-H and the edge of the first side SPE2-S1 may be substantially the same as a distance VEW3 between the third vertical portion SLT3-V and the edge of the fourth side SPE1-S4.

Referring to FIG. 6B, a second portion 230-S2 of the common electrode 230 that is positioned over the second sub-pixel electrode SPE2 (refer to FIG. 6A) in the liquid crystal display includes a fourth slit SLT4.

The fourth slit SLT4 may include a horizontal portion SLT4-H (hereinafter, referred to as a fourth horizontal portion) and a vertical portion SLT4-V (hereinafter, referred to as a fourth vertical portion). The fourth horizontal portion SLT4-H is at a position corresponding to a portion of the horizontal axis RLH2 (refer to FIG. 6A), and the fourth vertical portion SLT4-V is at a position corresponding to a portion of the vertical axis RLV2 (refer to FIG. 6A). A width HSW4 of the fourth horizontal portion SLT4-H may be the same as a width VSW4 of the fourth vertical portion SLT4-V.

Referring to FIG. 6C, average directors of the liquid crystals in the fifth to eighth domains DM5 to DM8 are different from each other. The average directors of the fifth to eighth domains DM5 to DM8, which are in accordance with alignment directions of the liquid crystals, when no pixel voltage is applied, are illustrated with dotted lines. The average directors of the fifth to eighth domains DM5 to DM8 observed when the pixel voltage is applied to the second sub-pixel electrode SPE2 are illustrated with a solid line. Hereinafter, the fifth domain DM5 will be mainly described as a representative example.

The average director of the liquid crystals in the fifth domain DM5 is changed under an influence of a fringe electric field generated in the third horizontal portion SLT3-H and the third vertical portion SLT3-V.

The average director of the fifth domain DM5 is tilted more toward a vertical direction D2 after the pixel voltage is applied to the second sub-pixel electrode SPE2 than before the pixel voltage is applied to the second sub-pixel electrode SPE2. That is, the average director of the liquid crystals in the fifth domain DM5 is tilted toward the vertical axis RLV2 (refer to FIG. 6A) when the pixel voltage is applied.

When the average directors of the fifth to eighth domains DM5 to DM8 are tilted toward the vertical direction D2, the brightness of the second sub-pixel SPX2 is increased. As the brightness of the second sub-pixel SPX2 increases, the side visibility of the high gray-scale range may be also improved. Detailed description of such will be provided below.

In an alternative exemplary embodiment, either one of the first slit SLT1 or the third slit SLT3 may have a uniform width. For instance, the width HSW3 of the third horizontal portion SLT3-H in the third slit SLT3 may be the same as the width VSW3 of the third vertical portion SLT3-V in the third slit SLT3.

Figure 7:
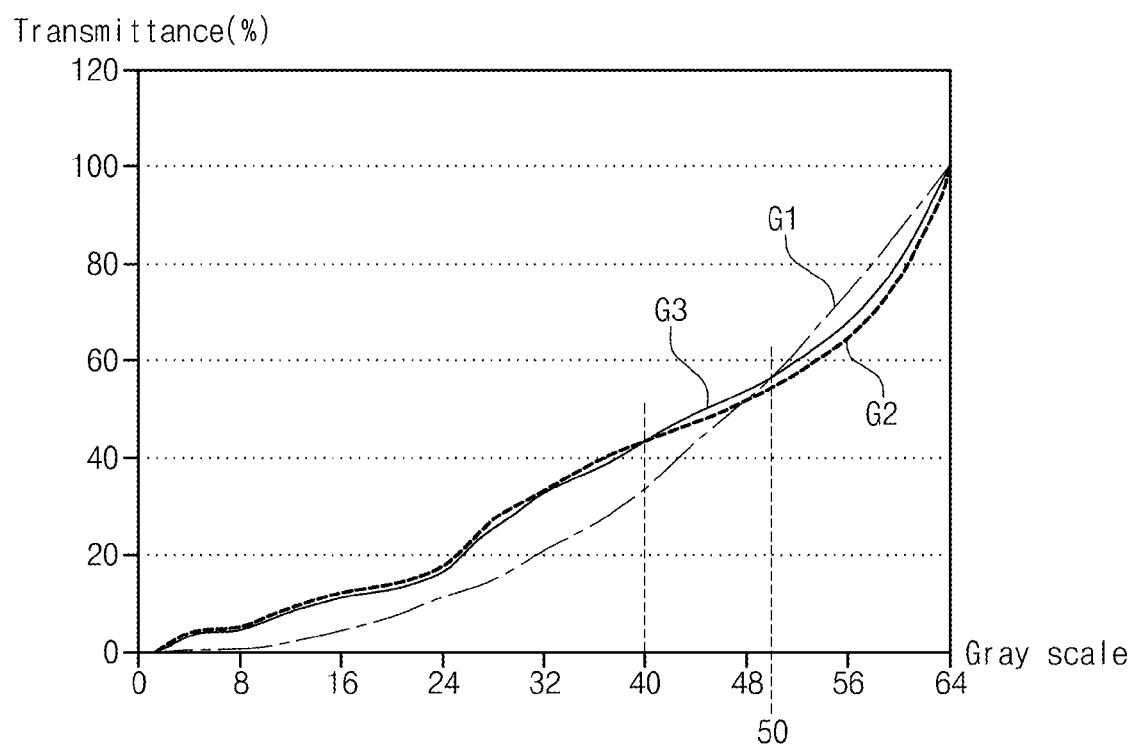
FIG. 7 is a graph showing a front gamma characteristic and side gamma characteristics of the liquid crystal display.

FIG. 7 is a graph showing a front gamma characteristic and side gamma characteristics of the liquid crystal display. A first graph G1 shows the front gamma characteristic, and a second graph G2 and a third graph G3 show the side gamma characteristic. The second graph G2 shows the side gamma characteristic of the pixel in which each of the first slit and third slit have a uniform width, and the third graph G3 shows the side gamma characteristic of the pixel according to the exemplary embodiment.

The first graph G1 has a gamma value such that a viewer can easily perceive a change in gray-scale on the display. That is, the first graph G1 represents a reference gamma curve. Within a range of gray-scale that is under an intermediate gray-scale (e.g., a range equal to or less than 40 gray-scale values) the difference between the third graph G3 the first graph G1 is smaller than the difference between the second graph G2 and the first graph G1. This is because the brightness of the first sub-pixel of the exemplary embodiment is lower than the brightness of a first sub-pixel in which each of the first slit and third slit have a uniform width.

In addition, above about 50 gray scale values in FIG. 7, the difference between the third graph G3 and the first graph G1 becomes smaller than the difference between the second graph G2 and the first graph G1. This is because the brightness of the second sub-pixel of the exemplary embodiment is higher than the brightness of a second sub-pixel in which each of the first slit and third slit have a uniform width.

About 40 gray scale values to about 50 gray scale values in FIG. 7, the difference between the third graph G3 and the first graph G1 is similar to the difference between the second graph G2 and the first graph G1.

That is, almost all of gray scale values, the third graph G3 showing the side gamma characteristic of the exemplary embodiment is closer in values to the first graph G1 showing the front gamma characteristic than is the second graph G2 showing the front gamma characteristic for a display in which the slits are the same width.

Because the pixel according to the exemplary embodiment has the side gamma characteristic which is close to the front gamma characteristic, the side visibility of the pixel is better than a pixel that has slits with a uniform width.

Table 1 shows side visibility values according to the width of the first slit SLT1 and the third slit SLT3. The unit of numbers in Table 1 is micrometer.

TABLE 1

| First slit SLT1 (VEW1/ VSW1:HEW1/HSW1) | Third slit SLT3 (VEW3/VSW3:HEW3/HSW3) | side visibility value |
| --- | --- | --- |
| 3/4:3/4 | 3/4:3/4 | 0.265 |
|  | 3/5:3/4 | 0.262 |
|  | 3/6:3/4 | 0.257 |
|  | 3/7:3/4 | 0.255 |
| 3/4:3/5 | 3/4:3/4 | 0.264 |
|  | 3/5:3/4 | 0.259 |
|  | 3/6:3/4 | 0.255 |
|  | 3/7:3/4 | 0.253 |

The side visibility values are obtained by dividing a value, which is obtained by subtracting side brightness from front brightness, by the front brightness. Thus, as the side visibility value decreases, the difference between the front brightness and the side brightness becomes small.

As shown in Table 1, the pixel has a relatively better side visibility when the width HSW1 (refer to FIG. 4A) of the first horizontal portion SLT1-H is greater than the width VSW1 (refer to FIG. 4A) of the first vertical portion SLT1-V in the first slit SLT1.

In addition, the pixel has a relatively better side visibility in the case that the width VSW3 (refer to FIG. 6A) of the third vertical portion SLT3-V is greater than the width HSW3 (shown in FIG. 6A) of the third horizontal portion SLT3-H in the third slit SLT3. As shown in Table 1, as the width VSW3 of the third vertical portion SLT3-V increases, the side visibility is improved.

Figure 8A:
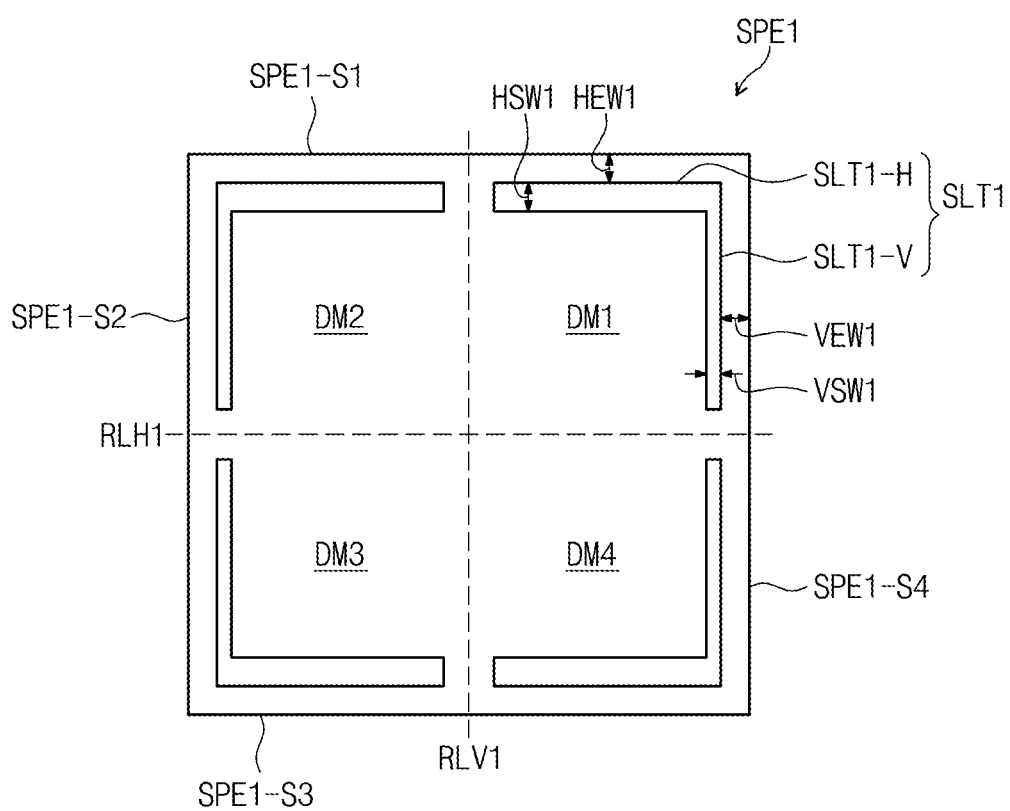
FIGS. 8A to 8C are plan views showing a first sub-pixel according to another exemplary embodiment.
Figure 8B:
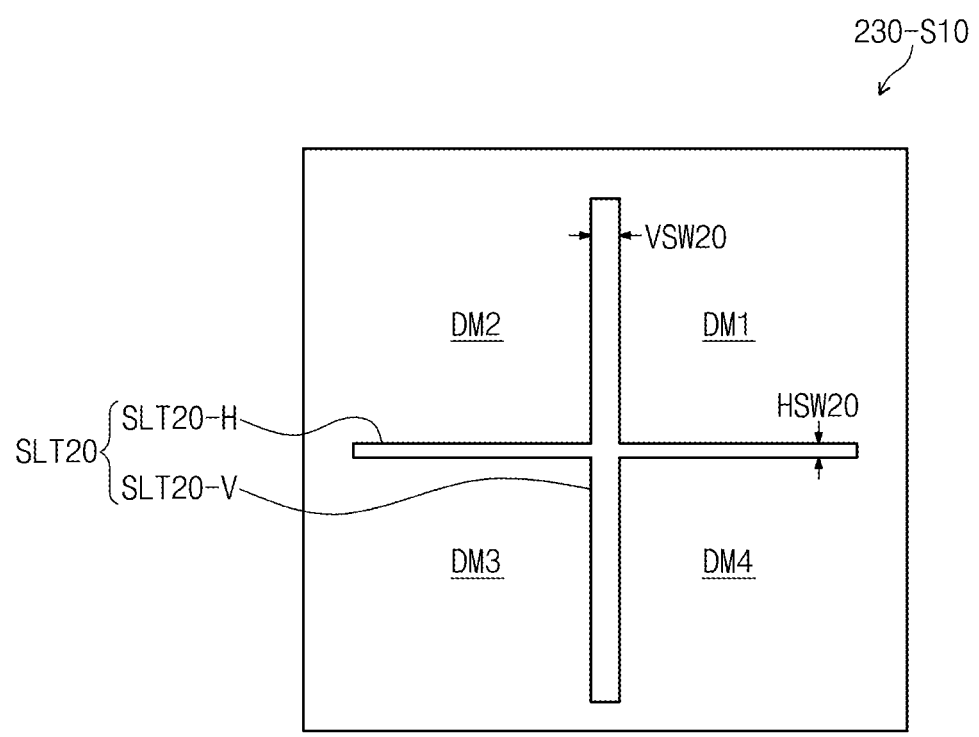
Figure 8C:
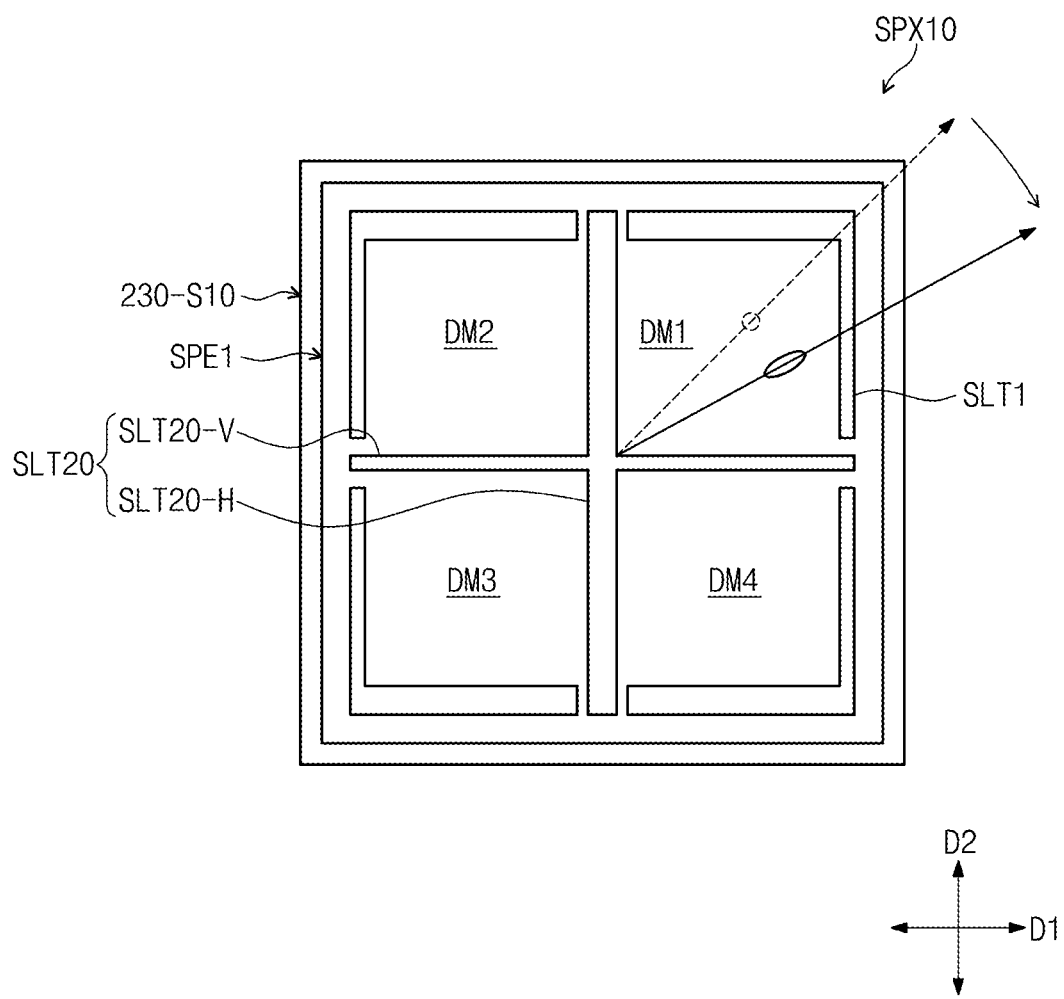

FIGS. 8A to 8C are plan views showing a first sub-pixel according to another exemplary embodiment. In FIGS. 8A to 8C, the same reference numerals denote the same elements in FIGS. 4A to 4C, and thus detailed descriptions of the same elements will be omitted.

Referring to FIG. 8A, a first sub-pixel electrode SPE1 includes first slits SLT1. Each of the first slits SLT1 includes a first horizontal portion SLT1-H and a first vertical portion SLT1-V. The first sub-pixel electrode SPE1 according to the present exemplary embodiment has the same structure and function as those of the first sub-pixel electrode SPE1 described with reference to FIG. 4A.

As shown in FIG. 8B, a first portion 230-S10 of a common electrode 230 overlaps a first sub-pixel electrode SPE1 (refer to FIG. 4A) in the liquid crystal display and includes a second slit SLT20.

The second slit SLT20 includes a second horizontal portion SLT20-H and a second vertical portion SLT20-V. The second horizontal portion SLT20-H is arranged at a position corresponding to a portion of a horizontal axis RLH1 (refer to FIG. 8A), and the second vertical portion SLT20-V is arranged at a position corresponding to a portion of a vertical axis RLV1 (refer to FIG. 8A).

The second vertical portion SLT20-V has a width VSW20 that is greater than the width HSW20 of the second horizontal portion SLT20-H.

In FIG. 8C, an average director of a first domain DM1, which is in accordance with an alignment direction of liquid crystals, when no pixel voltage is applied, is illustrated with a dotted line. The average director of the first domain DM1 observed when a pixel voltage is applied to the first sub-pixel electrode SPE1 is illustrated with a solid line.

The average director of the first domain DM1 is tilted toward a horizontal direction D1 (refer to FIG. 8A) after the pixel voltage is applied to the first sub-pixel electrode SPE1.

In the present exemplary embodiment, after the pixel voltage is applied to the first sub-pixel electrode SPE1, the average director of the first domain DM1 is tilted more toward the horizontal direction D1 (refer to FIG. 8A) than the average director of the first domain DM1 illustrated in the solid lines as shown in FIG. 4C.

This is because a vector sum of the average director of the liquid crystals according to the alignment direction of the liquid crystals and the liquid crystal directors around the second horizontal portion SLT20-H is greater than a vector sum of the average director of the liquid crystals according to the alignment direction of the liquid crystals and the liquid crystal directors around the second vertical portion SLT20-V.

As the average directors of the first to fourth domains DM1 to DM4 are tilted more toward the horizontal direction D1, the brightness of the first sub-pixel SPX1 decreases more gradually, so the side visibility may be improved in the low gray-scale range.

In an alternative embodiment, the width HSW1 of the horizontal portion SLT1-H may be the same as the width VSW1 of the first vertical portion SLT1-V.

The second sub-pixel SPX2 may have an average director that is tilted more toward a vertical direction D2 so as to improve the side visibility in the high gray-scale range. The second sub-pixel SPX2 may include a fourth slit SLT4 having a fourth horizontal portion SLT4-H (refer to FIG. 6B) of which a width is greater than that of a fourth vertical portion SLT4-V (refer to FIG. 6B).

Figure 9A:
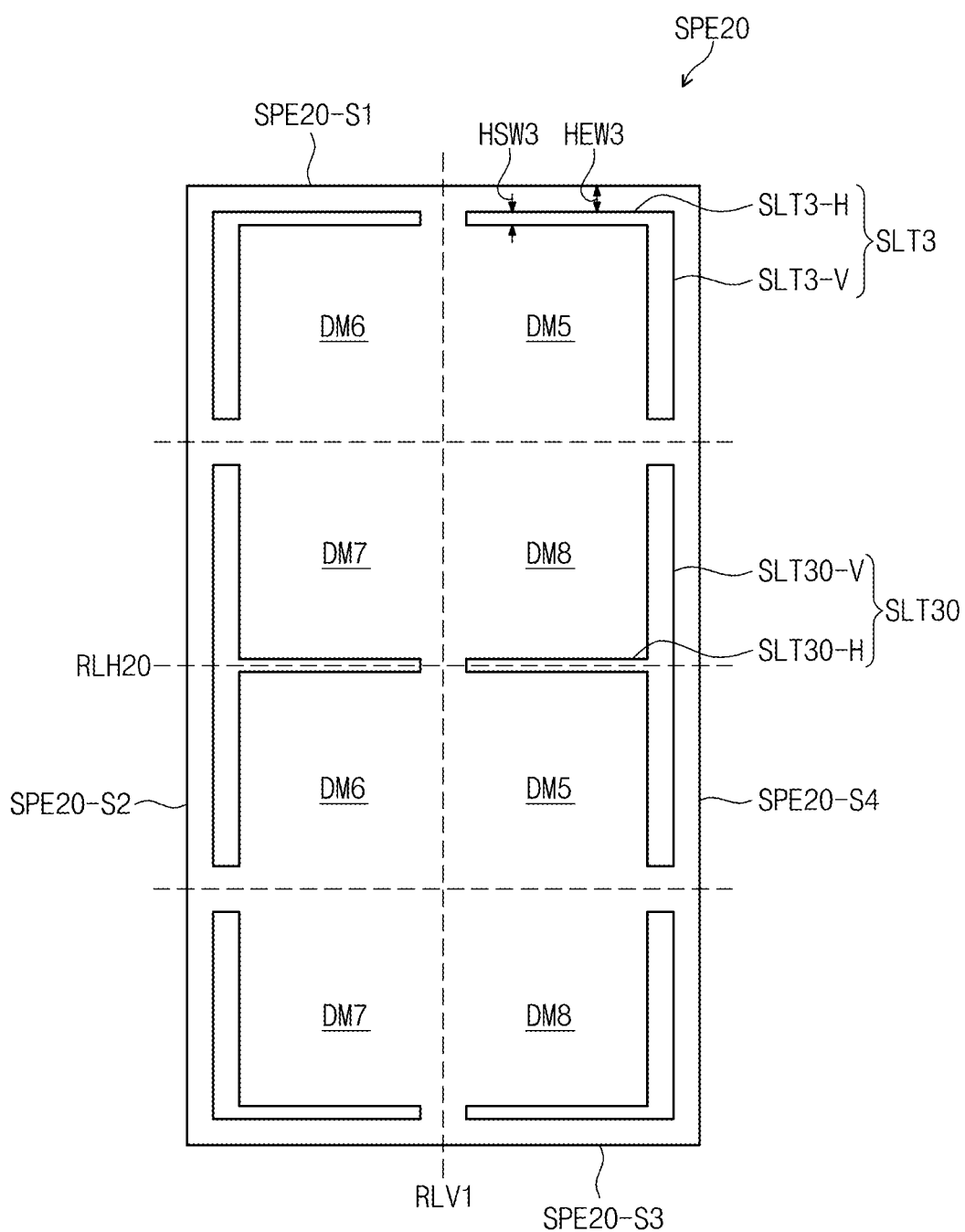
FIGS. 9A to 9C are plan views showing a second sub-pixel according to another exemplary embodiment.
Figure 9B:
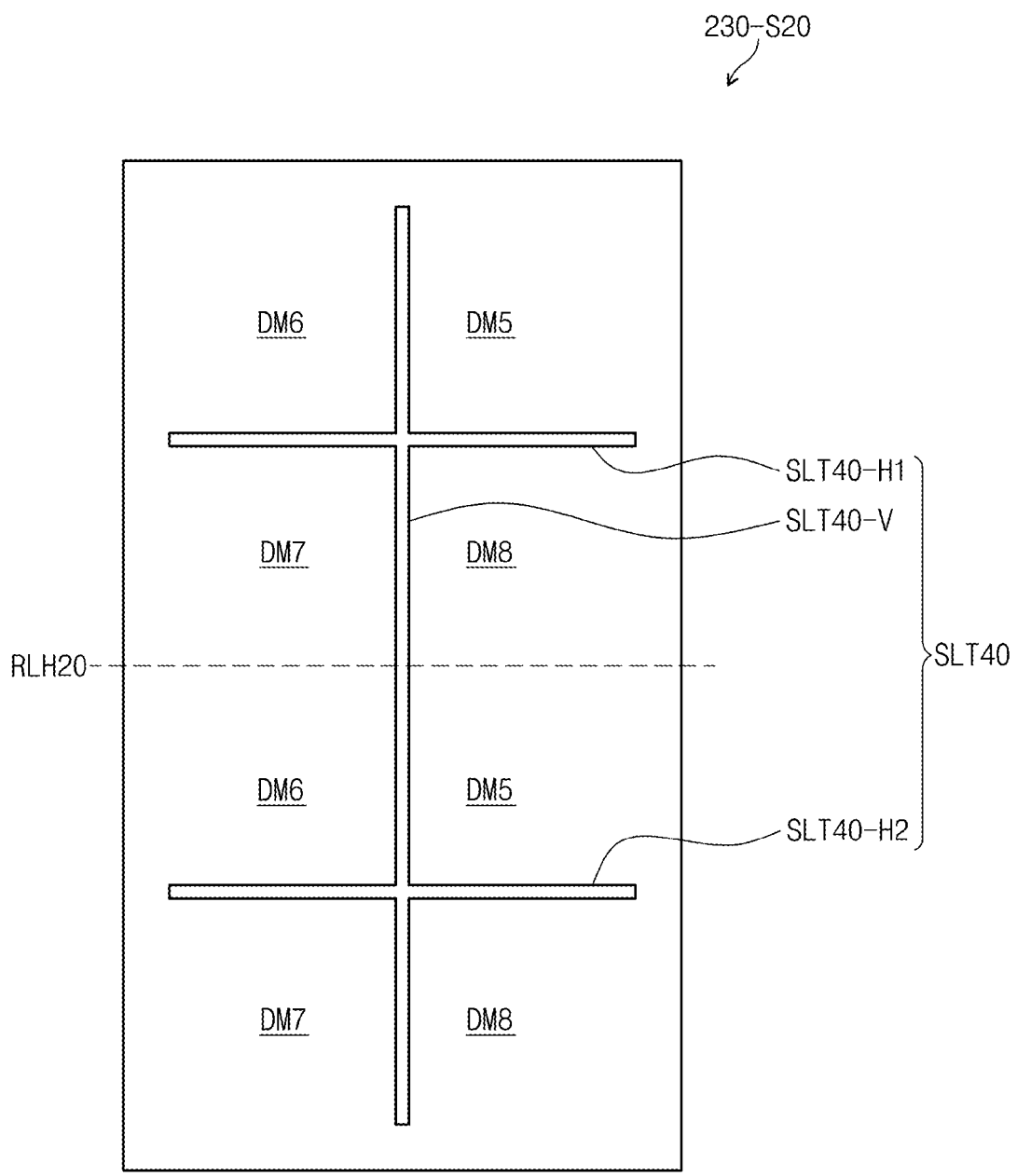
Figure 9C:
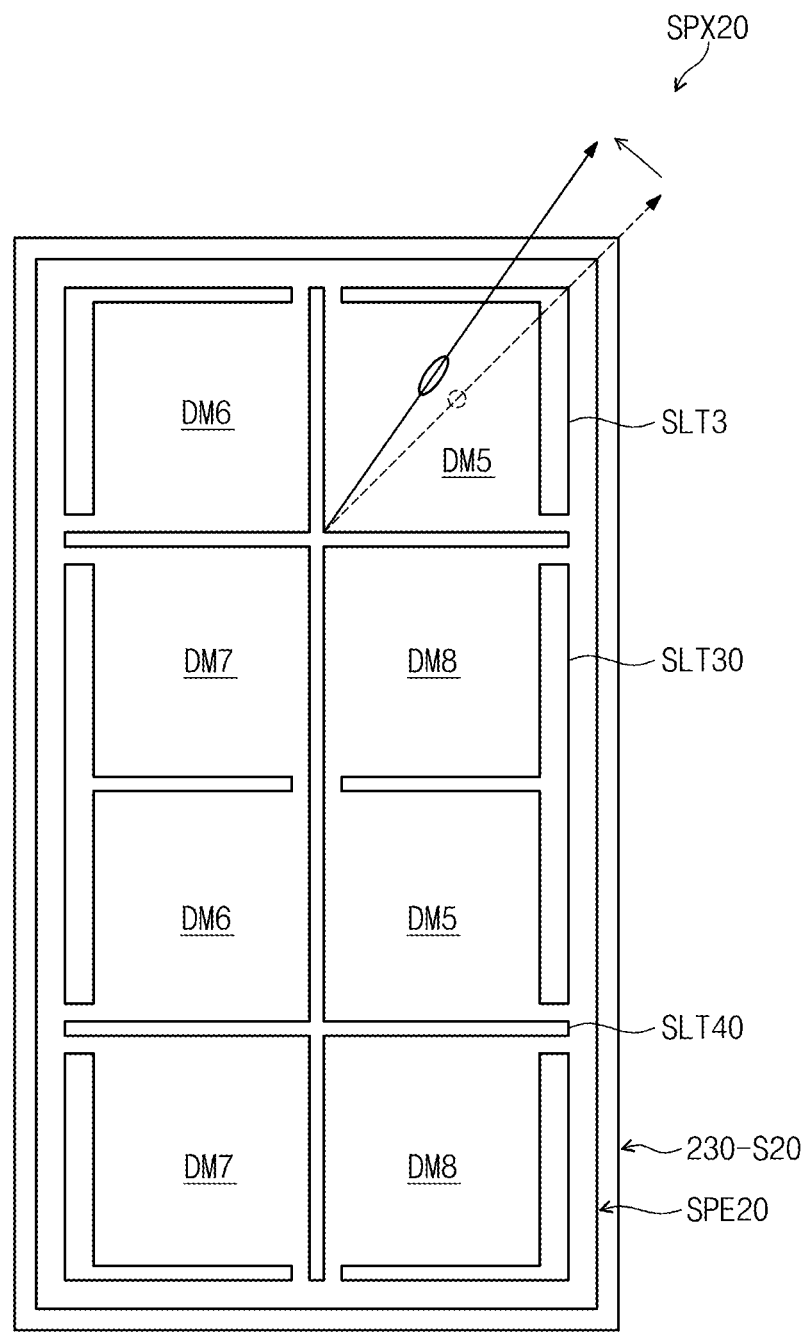

FIGS. 9A to 9C are plan views showing a second sub-pixel according to another exemplary embodiment. In FIGS. 9A and 9B, the same reference numerals denote the same elements as in FIGS. 6A to 6C, and thus detailed descriptions of the same elements will be omitted.

Referring to FIG. 9A, a second sub-pixel electrode SPE20 may include a plurality of third slits SLT3 and SLT30. Each of the third slits SLT3 and SLT30 includes a third horizontal portion SLT3-H and SLT30-H and a third vertical portion SLT3-V and SLT30-V.

The third slits SLT3 and SLT30 have different shapes from each other. In a first type of the third slits SLT3, an end portion of a third horizontal portion SLT3-H is connected to an end portion of a third vertical portion SLT3-V. In a second type of the third slits SLT30, an end portion of the third horizontal portion SLT30-H is connected to a center portion of the third vertical portion SLT30-V.

In the second type of the third slits SLT30, the third horizontal portion SLT30-H is disposed in a position corresponding to a horizontal axis RLH20 that divides the second sub-pixel electrode SPE20.

In the first type of the third slits SLT3, the third horizontal portion SLT3-H is arranged to face horizontal sides SPE20-S1 and SPE20-S3 of the second sub-pixel electrode SPE20. In the second sub-pixel electrode SPE20, two fifth domains DM5, two sixth domains DM6, two seventh domains DM7, and an two eighth domains DM8 are defined at both sides of horizontal axis RLH20.

As shown in FIG. 9B, a second portion 230-S20 of a common electrode 230 positioned to overlap the second sub-pixel electrode SPE2 in the liquid crystal display includes a fourth slit SLT40.

The fourth slit SLT40 may include a plurality of fourth horizontal portions SLT40-H1 and SLT40-H2 and a fourth vertical portion SLT40-V. In FIG. 9B, the fourth slit SLT40 includes two fourth horizontal portions SLT40-H1 and SLT40-H2 as a representative example.

The two fourth horizontal portions SLT40-H1 are arranged at both sides of the horizontal axis RLH20. Each of the fourth horizontal portions SLT40-H1 and SLT40-H2 is positioned at a border between the fifth and sixth domains DM5 and DM6 (refer to FIG. 9A) and the seventh and eighth domains DM7 and DM8 (refer to FIG. 9A). The fourth vertical portion SLT40-V is arranged at a position corresponding to a portion of a vertical axis RLV20 (refer to FIG. 9A).

In the present exemplary embodiment, a second sub-pixel SPX20 includes a greater number of domains than the second sub-pixel SPX2 shown in FIG. 6C. As shown in FIG. 9C, the second sub-pixel SPX20 may be divided into two pairs of the fifth to eighth domains DM5 to DM8.

Similar to the fifth to eighth domains DM5 to DM8 shown in FIG. 6C, average directors of the two pairs of the fifth to eighth domains DM5 to DM8 are tilted toward the vertical direction D2.

In another exemplary embodiment, the number of the domains of the first sub-pixels SPX1 may be increased by changing the shapes of the first slit SLT1 and the second slit SLT2 of the first sub-pixel SPX1.

Figure 10:
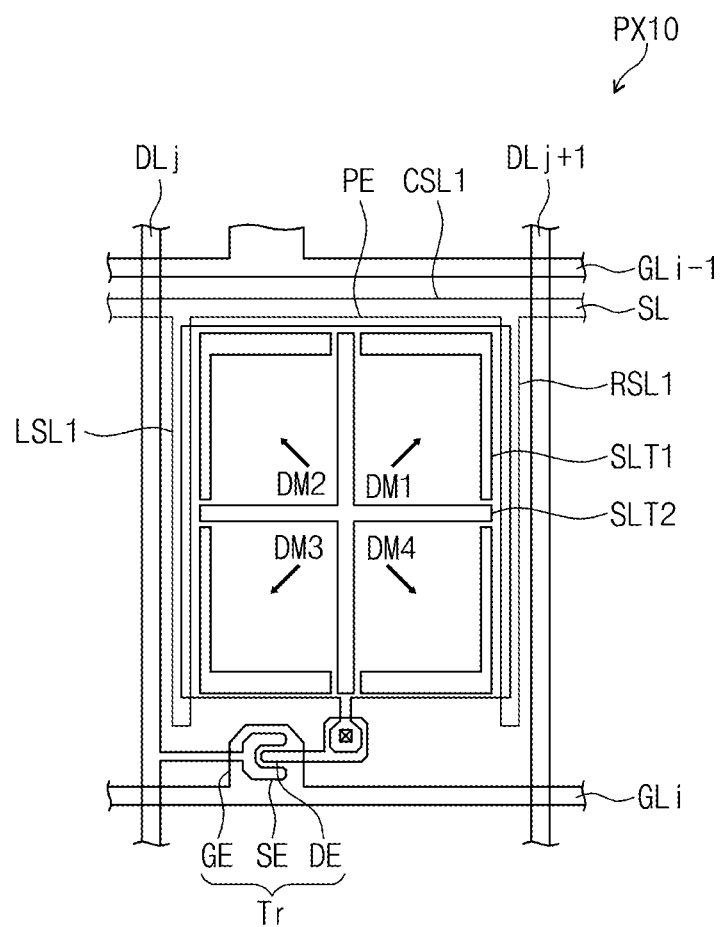
FIG. 10 is a plan view showing a pixel according to another exemplary embodiment.
Figure 11:
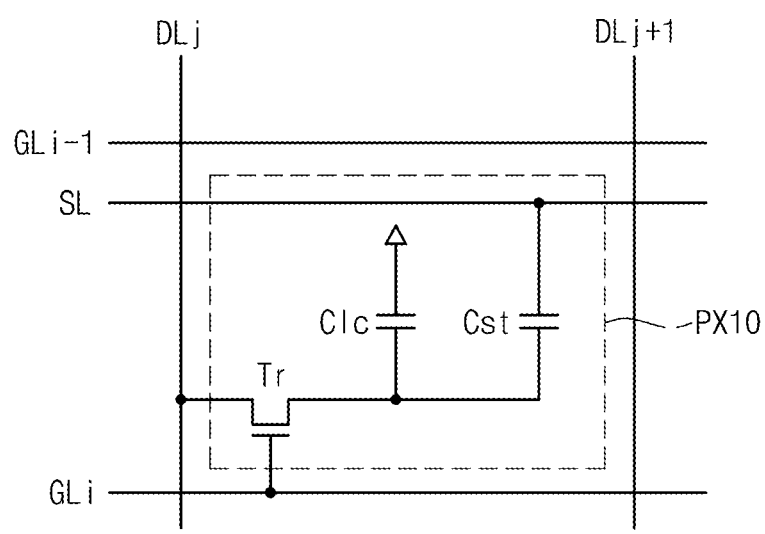
FIG. 11 is an equivalent circuit diagram of a pixel shown in FIG. 10.

FIG. 10 is a plan view showing a pixel according to another exemplary embodiment, and FIG. 11 is an equivalent circuit diagram of a pixel shown in FIG. 10.

In the present exemplary embodiment, different from the pixel PX shown in FIGS. 1 and 2, a pixel PX10 of a liquid crystal display does not include the first sub-pixel SPX1 and the second sub-pixel SPX2. The pixel PX10 shown in FIGS. 10 and 11 has substantially the same circuit configuration as the first sub-pixel SPX1 shown in FIGS. 1 and 2.

A first substrate 100 (refer to FIG. 3) may be defined as a plurality of pixel areas when viewed in a plan view. Pixel electrodes PE are arranged in the pixel areas, respectively. Each pixel area may be defined by two successive gate lines GLi−1 and GLi and two successive data lines DLj and DLj+1, which are arranged on the first base substrate 110 (refer to FIG. 3).

The thin film transistor Tr1 applies a data signal to the pixel electrode PE in response to a gate signal provided through a first gate line GLi.

The pixel electrode PE includes at least one first slit SLT1, and the common electrode 230 (refer to FIG. 3) includes a second slit SLT2. The first slit SLT1 includes a first horizontal portion and a first vertical portion, and the second slit SLT2 includes a second horizontal portion and a second vertical portion.

In FIG. 10, the pixel electrode PE has the same shape as the first sub-pixel electrode SPE1 shown in FIG. 4A and the common electrode has the same shape as the common electrode shown in FIG. 4B. Thus, when the pixel voltage is charged in the pixel PX10, the average director of liquid crystals are tilted more toward the horizontal axis RLH1 (refer to FIG. 4A) than before the pixel voltage is charged in the pixel PX10. Thus, the side visibility of the pixel PX10 may be improved in the low gray-scale range.

The shapes of the first slit SLT1 and the second slit SLT2 may be changed to the shapes of the third slit SLT3 and the fourth slit SLT4 shown in FIGS. 6A and 6B. Thus, the side visibility of the pixel PX10 may be improved in the high gray-scale range.

In the present exemplary embodiment, the shape of the pixel electrode PE and the shape of the common electrode corresponding to the pixel electrode PE should not be limited to the shapes shown in FIG. 10. The shapes of the pixel electrode PE and the portion of common electrode corresponding to the pixel electrode PE may be changed to the shapes shown in FIGS. 8C and 9C.

Although the exemplary embodiments have been described, it is understood that the present invention should not be limited to these exemplary embodiments but various changes and modifications can be made by one ordinary skilled in the art within the spirit and scope of the present disclosure including the appended claims.

What is claimed is:

1. A liquid crystal display comprising:
at least one pixel including a first sub-pixel charged with a first voltage and a second sub-pixel charged with a second voltage different from the first voltage, the first subpixel and the second sub-pixel are arranged in a first direction;
a first substrate on which a first sub-pixel electrode provided in the first sub-pixel and a second sub-pixel electrode provided in the second sub-pixel are disposed;
a second substrate that faces the first substrate and on which a common electrode facing the first sub-pixel electrode and the second sub-pixel electrode is disposed; and
liquid crystals interposed between the first substrate and the second substrate,
wherein the first sub-pixel electrode comprises at least one first slit having a first extending portion extending in a second direction perpendicular to the first direction and a second extending portion extending in the first direction, wherein the first extending portion includes a first linear edge extending parallel with and adjacent to a first outer edge of the first sub-pixel electrode and a second linear edge extending parallel with the first linear edge, and the second extending portion includes a third linear edge connected to the first linear edge and adjacent to a second outer edge of the first sub-pixel electrode and a fourth linear edge connected to the second linear edge, and a width of the first extending portion is different from a width of the second extending portion.

2. The liquid crystal display of claim 1, wherein the first sub-pixel comprises a first thin film transistor outputting a data signal and a first liquid crystal capacitor connected to the first thin film transistor, and the second sub-pixel comprises a second thin film transistor outputting the data signal, a second liquid crystal capacitor connected to the second thin film transistor, a third thin film transistor turned on at a different time point from the second thin film transistor, and a coupling capacitor electrically connected to the second liquid crystal capacitor to lower a voltage charged in the second liquid crystal capacitor when the third thin film transistor is turned on.

3. The liquid crystal display of claim 1, wherein the first sub-pixel is divided into a plurality of domains and the liquid crystals are aligned in a different direction in each domain.

4. The liquid crystal display of claim 3, wherein the common electrode comprises a second slit disposed in a first portion of the common electrode positioned over the first sub-pixel electrode, the second slit is disposed at a border between the domains of the first sub-pixel, and the second slit comprises a third extending portion extending in the second direction and a fourth extending portion extending in the first direction.

5. The liquid crystal display of claim 4, wherein a width of the third extending portion is different from a width of the fourth extending portion.

6. The liquid crystal display of claim 5, wherein the first slit is arranged in each of the domains in the first sub-pixel.

7. The liquid crystal display of claim 6, wherein the first voltage has a level higher than the second voltage, and the first extending portion has a width larger than the second extending portion.

8. The liquid crystal display of claim 7, wherein a distance between the first linear edge of the first extending portion and the first outer edge of the first sub-pixel electrode is substantially the same as a distance between the third linear edge of the second extending portion and the second outer edge of of the first sub-pixel electrode in a plan view.

9. The liquid crystal display of claim 7, wherein the second sub-pixel electrode comprises at least one third slit having a fifth extending portion extending in the second direction and a sixth extending portion extending in the first direction, a width of the fifth extending portion is larger than a width of the sixth extending portion, and the third slit is extending along outer edges of the second sub-pixel electrode.

10. The liquid crystal display of claim 9, wherein the second sub-pixel is divided into a plurality of domains and the liquid crystals are aligned in a different direction in each domain, and the third slit is arranged in each of the domains of the second sub-pixel.

11. The liquid crystal display of claim 10, wherein the common electrode comprises a fourth slit disposed in a second portion of the common electrode positioned over the second sub-pixel electrode, the fourth slit is disposed at a border between the domains of the second sub-pixel, and the fourth slit comprises a seventh extending portion extending in the first direction and a eighth extending portion extending in the second direction.

12. The liquid crystal display of claim 11, wherein a width of the seventh extending portion is greater than a width of the eighth extending portion.

13. The liquid crystal display of claim 7, wherein the second sub-pixel electrode comprises a plurality of third slits, each including a fifth extending portion extending in the second direction and a sixth extending portion extending in the first direction and having a width larger than a width of the fifth extending portion, the fifth extending portion of one of the third slits is arranged in a position corresponding to a first axis that divides the second sub-pixel electrode in the second direction, and the fifth extending portion of a remaining one of the third slits is arranged in a position parallel to an outer edge of the second sub-pixel electrode.

14. The liquid crystal display of claim 13, wherein the common electrode comprises a fourth slit disposed in a second portion of the common electrode positioned over the second sub-pixel electrode and including a plurality of sixth extending portions and a seventh extending portion, the sixth extending portion is arranged in a position corresponding to a second axis that divides the second sub-pixel electrode in the first direction, and the seventh extending portions are respectively arranged at both sides of the first axis dividing the second sub-pixel electrode.

15. A liquid crystal display comprising:
a first substrate that includes a gate line applied with a gate signal and a data line applied with a data signal;
a pixel electrode disposed on the first substrate;
a thin film transistor disposed on the first substrate to apply the data signal to the pixel electrode in response to the gate signal;
a second substrate that faces the first substrate and on which a common electrode is disposed; and
liquid crystals interposed between the first substrate and the second substrate, wherein the pixel electrode comprises at least one first slit that includes a first extending portion extending in a first direction and a second extending portion extending in a second direction perpendicular to the first direction and having a width different from a width of the first extending portion, wherein the first extending portion includes a first linear edge extending parallel with and adjacent to an outer edge of the first subpixel and a second linear edge extending parallel with the first linear edge, and the second extending portion includes a third linear edge connected to the first linear edge and a fourth linear edge connected to the second linear edge.

16. The liquid crystal display of claim 15, wherein the pixel electrode is divided into a plurality of domains, the liquid crystals are aligned in a different direction in each domain, and the first slit is disposed in each of the domains.

17. The liquid crystal display of claim 16, wherein the common electrode comprises a second slit disposed in a portion of the common electrode that overlaps the first sub-pixel, and the second slit comprises a third extending portion extending in the first direction and a fourth extending portion extending in the second direction, and the second slit is disposed at a border between the domains.

18. The liquid crystal display of claim 17, wherein a width of the third extending portion is different from a width of the fourth extending portion.

19. The liquid crystal display of claim 18, wherein a width of the first extending portion is larger than a width of the second extending portion, and a width of the third extending portion is larger than the width of the fourth extending portion.

* * * * *